(12) United States Patent
Ibuki

(10) Patent No.: US 9,127,602 B2
(45) Date of Patent: Sep. 8, 2015

(54) CONTROL DEVICE FOR INTERNAL COMBUSTION ENGINE

(75) Inventor: Taku Ibuki, Gotenba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 367 days.

(21) Appl. No.: 13/813,559

(22) PCT Filed: Aug. 4, 2010

(86) PCT No.: PCT/JP2010/063594
§ 371 (c)(1),
(2), (4) Date: Jan. 31, 2013

(87) PCT Pub. No.: WO2012/017563
PCT Pub. Date: Feb. 9, 2012

(65) Prior Publication Data
US 2013/0131961 A1 May 23, 2013

(51) Int. Cl.
*F02B 37/00* (2006.01)
*F02D 45/00* (2006.01)
*F02B 37/16* (2006.01)
*F02B 37/18* (2006.01)
*F02B 37/24* (2006.01)
*F02D 23/00* (2006.01)

(52) U.S. Cl.
CPC .............. *F02D 45/00* (2013.01); *F02B 37/004* (2013.01); *F02B 37/16* (2013.01); *F02B 37/18* (2013.01); *F02B 37/24* (2013.01); *F02D 23/00* (2013.01); *Y02T 10/144* (2013.01)

(58) Field of Classification Search
CPC ......... F02D 43/00; F02D 45/00; F02D 23/00; F02B 37/004; F02B 37/22; F02B 37/24

USPC ........ 123/559.1, 559.2, 562; 60/605.1, 605.2, 60/608, 611, 612; 701/103, 108
See application file for complete search history.

(56) References Cited

U.S. PATENT DOCUMENTS

| 2004/0103654 A1* | 6/2004 | Ohtake et al. ................... 60/295 |
| 2006/0042247 A1 | 3/2006 | Haugen |

FOREIGN PATENT DOCUMENTS

| JP | A-63-029026 | 2/1988 |
| JP | A-2005-009314 | 1/2005 |
| JP | A-2005-146906 | 6/2005 |
| JP | A-2008-514842 | 5/2008 |

* cited by examiner

*Primary Examiner* — Hai Huynh
(74) *Attorney, Agent, or Firm* — Oliff PLC

(57) ABSTRACT

A control device is applied to an engine having a supercharger and a control value. The supercharger contains an opening-area control member that changes an opening-area of an approach zone to a turbine of the supercharger so as to change an amount of energy of the exhaust gas entering into the supercharger. The control valve changes a valve-opening degree so as to change an amount of energy of the exhaust gas entering into the supercharger. At a certain instruction time point, the control device gives an instruction to the control valve so as to change the valve-opening degree by a target difference. At this time point, the control device gives an instruction to the opening-area control member, based on the target difference and a parameter relating to a response-time length of the control valve, so as to change the opening-area of the approach zone.

11 Claims, 15 Drawing Sheets

| Mode | 1 | 2 | 3 | 4 |
|---|---|---|---|---|
| ECV (exhaust gas chageover valve) | fully close | open | fully open | fully open |
| ACV (intake air changeover valve) | fully close | fully close | open | fully open |
| EBV (exhaust gas bypass valve) | fully close | fully close | fully close | open |

CONTROL DEVICE FOR INTERNAL COMBUSTION ENGINE

TECHNICAL FIELD

The present invention relates to a control device for internal combustion engine having a supercharger.

BACKGROUND ART

An internal combustion engine having a supercharger (exhaust-type supercharger with variable nozzle) is conventionally known. This supercharger includes a turbine, a variable nozzle and a compressor. This turbine is provided on an exhaust gas passage of the internal combustion engine and driven by energy of the exhaust gas. The variable nozzle can change an opening-area of an approach zone through which the exhaust gas entered into the turbine. The compressor is provided on an intake air passage of the internal combustion engine and driven when the turbine is driven. A bypass passage and a control valve are furthermore provided to the exhaust gas passage of this internal combustion engine. The bypass passage is a branched passage from the exhaust gas passage and by-passes the turbine. The control valve is provided on the bypass passage and can change an opening-area of the bypass passage. The internal combustion engine is hereinafter simply referred to as "engine."

The compressor noted above compresses air flew into the compressor and discharges the compressed air so as to be entered into a combustion chamber of the engine. That is, a supercharging is performed. More specifically, the supercharger adjusts the opening-area of the bypass passage by controlling the control valve based on operating condition of the engine and changes the opening-area of the approach zone by controlling the variable nozzle based on the operating condition of the engine. The amount of the energy of the exhaust gas entered into the turbine (hereinafter referred to as "energy entered into the turbine") is controlled by the control valve and the variable nozzle. Pressure of air entered into the combustion chamber of the engine (supercharging pressure) is thereby matched to a value appropriate to the operating condition of the engine.

One of the conventional control devices provided for the internal combustion engines (hereinafter referred to as "conventional device") controls the energy entered into the turbine by adjusting the control valve and the variable nozzle based on engine rotation speed. The conventional device thereby controls the supercharging pressure (for example, see JP2005-146906A).

SUMMARY OF INVENTION

1. Technical Problem

The conventional device controls the amount of the energy entered into the turbine by the control valve and the variable nozzle, as referred to above. In other words, the conventional device gives an instruction to the control valve and the variable nozzle in order to adjust them so that the amount of the energy entered into the turbine matches to a predetermined target value. In this regard, it is presupposed in the conventional device that required length of time between a time point where an instruction is given to the control valve and a time point where the valve-opening degree of the control valve matches to a degree corresponding to the instruction (hereinafter referred to as "response-time length") is substantially zero. That is, the conventional device controls the control valve without considering the response-time length of the control valve. By the same token, the conventional device controls the variable nozzle without considering the response-time length of the variable nozzle.

In the case that "actual response-time lengths" of the control valve and the variable nozzle are shorter than "required response-time lengths", the amount of the energy entered into the turbine substantially matches to the target value without considering the response-time lengths of the control valve and the variable nozzle. In the case that "actual response-time lengths" of the control valve and the variable nozzle are longer than "required response-time lengths", however, the amount of the energy entered into the turbine substantially may not match to the target value, if not considering the response-time lengths of the control valve and the variable nozzle.

The supercharging pressure does not match to a value appropriate to operating conditions of the engine in the case that the amount of the energy entered into the turbine does not match to the target value. The conventional device, therefore, has a problem that the device may not control the supercharging pressure appropriately in the period from a time point where instructions are given to the control valve and the variable nozzle for controlling them to the elapse of the response-time lengths.

In view of the above problem, it is an object of the present invention to provide a control device for internal combustion engine that can appropriately control the amount of the energy entered into the turbine.

2. Solution to Problem

A control device according to the present invention for solving the above problem is applied to an internal combustion engine having at least one supercharger and at least one control valve.

More specifically, the at least one supercharger contains a turbine provided on an exhaust gas passage of the engine and driven by an exhaust gas being entered into the turbine through an "approach zone." The exhaust gas passage is a passage to discharge exhaust gas that is from the combustion chamber of the engine to an outside of the engine. The at least one supercharger further contains a compressor provided on an intake air passage of the engine and compressing air flowing through the intake air passage by being driven upon the turbine being driven. The intake air passage a passage to introduce air from the outside of the engine to the combustion chamber. Additionally, the at least one supercharger contains an opening-area control member changing "an amount of energy of the exhaust gas entered into the turbine" by controlling an opening-area of the approach zone depending on a "first instruction."

The above "opening-area control member" may be a member that can control the opening-area of the approach zone, but is not specifically limited. Furthermore, the above "approach zone" may be a zone that exists between the combustion chamber and the turbine, but is not specifically limited.

As an example of the opening-area control member, a member that has a plurality of blade-shape parts (vane) arranged so as to surround the turbine and a chassis to enter the exhaust gas toward the blade-shape parts (so-called variable nozzle) may be employed. In regard to this variable nozzle, an area between one blade-shape part and other blade-shape part next to the one blade-shape part corresponds to the above "approach zone." Furthermore, the variable nozzle is configured to change the opening-area of the approach zone by rotating the blade-shape parts in accordance with predetermined instructions.

Next, the at least one control valve changes "an amount of energy of the exhaust gas entered into the turbine" by controlling a valve-opening degree of the control valve depending on a "second instruction."

The above "control valve" may be a valve by which the amount of the energy of the exhaust gas entered into the turbine changes depending on the valve-opening degree thereof, but is not specifically limited. As an example of the control valve, a valve that has a plate-shape part that can rotate around a predetermined axis line (for example, a swing-arm valve and a butterfly valve) may be employed.

As described above, "both" of the opening-area control member that operates in accordance with the first instruction and the control valve that operates in accordance with the second instruction change the amount of the energy of the exhaust gas entered into the turbine in regard to the control device of the present invention. In other words, the amount of the energy of the exhaust gas entered into the turbine is controlled by "both" of the opening-area control member and the control valve.

The control device of the present invention is applied to the internal combustion engine that has the above configuration.

The control device comprises a "control means" that gives an instruction to the opening-area control member so as to change the opening-area of the approach zone. "To give an instruction to the opening-area control member so as to change the opening-area of the approach zone" is hereinafter referred to as "to control the opening-area of the approach zone."

The above control device instructs the opening-area control member based on predetermined information to consider the response-time length of the control valve (that is, the control device controls the opening-area of the approach zone) when controlling the control valve. The control of the energy of the exhaust gas entered into the turbine by changing the valve-opening degree of the control valve is performed in parallel with the control of the energy of the exhaust gas entered into the turbine by changing the opening-area of the approach zone.

More specifically, the control means is configured so that,
(1) when the "second instruction" is given to the control valve at an "instruction time point" so as to "change the valve-opening degree by a target difference",
(2) the control means determines a "control rule of the opening-area of the approach zone", wherein the control rule is a relationship of the opening-area of the approach zone with respect to time, based on
  (A) the target difference in the valve-opening degree and
  (B) a "parameter relating to a response-time length", wherein the response-time length is "a required length of time between a time point where an instruction to control the valve-opening degree of the control valve is given to the control valve and a time point where the valve-opening degree of the control valve matches to a degree corresponding to the instruction", and
(3) the control means gives the "first instruction" to the opening-area control member so as to "start controlling the opening-area of the approach zone in accordance with the control rule at the instruction time point as starting time point."

As described above, the control means controls the opening-area of the approach zone (the above (3)) in accordance with the control rule of the opening-area (the above (2)) determined based on the target difference in the valve-opening degree (the above (A)) and the parameter relating to the response-time length (the above (B)) when the second instruction is given to the control valve (the above (1)). That is, the control means controls the opening-area of the approach zone "with consideration of the response-time length of the control valve" in parallel with the change of the valve-opening degree of the control valve.

The above configuration enables the control device to control the amount of the energy of the exhaust gas entered into the turbine to get closer to the target amount compared with the amount of the energy of the exhaust gas entered into the turbine in the case that the opening-area of the approach zone is changed "without considering the response-time length of the control valve." That is, the control device of the present invention can control the amount of the energy of the exhaust gas entered into the turbine appropriately even in the period from a time point at which the second instruction is given to the control valve to a time point at which the response-time length of the control valve elapses.

The above "parameter relating to the response-time length" may be a parameter that relates to the response-time length of the control valve, but is not specifically limited. As an example of the parameter relating to the response-time length, a parameter that is determined through some experiments carried out in advance, a parameter that is obtained (learned) during actual operation of the engine provided with the control device, and the both of them may be employed.

The above "control rule of the opening-area" may be a control rule that represents a relationship between the opening-area of the approach zone and time, but is not specifically limited. As an example of the control rule of the opening-area, a profile of the opening-area that represents a value of the opening-area of the approach zone with respect to time from a predetermined starting time point, a function whose input is time from a predetermined starting time point and whose output is a value of the opening-area of the approach zone, and a combination of a target value of the opening-area and a length of time in which an instruction to match the opening-area to the target value is given to the opening-area control member from a predetermined starting time point.

The above "opening-area control member" is then operated in accordance with the control rule of the opening-area as described above (see the above (3)). In this regard, the opening-area control member may be configured so as to be a member where "a speed of change in the opening-area of the approach zone by the opening-area control member" due to the first instruction is "faster" than "a speed of change in the valve-opening degree of the control valve by the control valve" due to the second instruction.

In this regard, the above "speed of change in the opening-area of the approach zone" represents a required length of time to change the opening-area by "a required amount of change in the opening-area in order to change the amount of the energy entered into the turbine by a unit energy amount", wherein the unit energy amount means a predetermined amount of the energy entered into the turbine. Furthermore, the above "speed of change in the valve-opening degree" represents a required length of time to change the valve-opening degree by "a required amount of change in the valve-opening degree in order to change the amount of the energy entered into the turbine by the above unit energy amount."

As described above, the amount of the energy of the exhaust gas entered into the turbine may not match the target amount due to the response-time length of the control valve. That is, some difference may occur between the amount of the energy of the exhaust gas entered into the turbine and the target amount. In the case that the control device compensates an energy amount corresponding to this "difference" by changing the opening-area of the approach zone, if the speed of change in the opening-area of the approach zone is faster than the speed of change in the valve-opening degree of the control valve, then the control device can quickly compensate this "difference" and quickly bring the amount of the energy of the exhaust gas entered into the turbine closer to the target amount.

In addition, the control device can compensate the above "difference" at least partly even in the case that the speed of change in the opening-area of the approach zone is "slower" than the speed of change in the valve-opening degree of the control valve. The amount of the energy of the exhaust gas entered into the turbine in this case, therefore, gets closer to the target amount compared with the amount of the energy of the exhaust gas entered into the turbine in the case that the control device does not perform the above compensation (that is, in the case that the control device does not control the opening-area of the approach zone "in consideration of the response-time length of the control valve"). The above "difference" is hereinafter referred to as "difference in energy" for convenience.

The control device of the present invention and the opening-area control member, which is one of controlled objects by the control device, are described above. Next, examples of the above "control rule of the opening-area" and the "parameter relating to the response-time length" are described below.

As "first embodiment" of the control device of the present invention, the control means may be configured to determine "a target opening-area of the approach zone" and "a target instruction-time length" as the control rule of the opening-area, wherein the target instruction-time length is a length of time where the instruction is given to the opening-area control member so as to match the opening-area of the approach zone to the target opening-area.

Furthermore, the control means of the above embodiment may be configured to give "the instruction to the opening-area control member so as to match the opening-area of the approach zone to the target opening-area" as the first instruction "during a period from the instruction time point as starting time point to a time point where the target instruction-time length elapses."

The control device of this embodiment employs "only the target opening-area and the target instruction-time length" as the control rule of the opening-area. Therefore, this embodiment enables the control device to control the opening-area of the approach zone more easily compared with a control device that employs a complicated control rule (such as a profile of the opening-area that represents a value of the opening-area of the approach zone with respect to time from a predetermined starting time point).

Furthermore, in regard to the control device of the first embodiment, the opening-area control member may be configured to be a member where "a required length of time from the instruction time point to a time point where the opening-area of the approach zone matches to the target opening-area" is shorter than "a required length of time from the instruction time point to a time point where the valve-opening degree of the control valve is changed by the target difference in the valve-opening degree."

As described above, the above configuration enables the control device to quickly compensate the above difference in energy and quickly bring the amount of the energy of the exhaust gas entered into the turbine closer to the target amount in the case that the control device compensates the difference in energy by changing the opening-area of the approach zone.

Next, as "second embodiment" of the control device of the present invention, the control means may be configured to employ "a referential response-time length" and "a referential difference in the valve-opening degree" as the parameter relating to the response-time length, wherein the referential response-time length is a required length of time between a first time point where an instruction is given to the control valve so as to change the valve-opening degree from a first valve-opening degree to a second valve-opening degree and a second time point where the valve-opening degree of the control valve matches to the second valve-opening degree, and the referential difference in the valve-opening degree is a difference between a magnitude of the first valve-opening degree and a magnitude of the second valve-opening degree.

As described above, the control valve changes the valve-opening degree thereof depending on an instruction (the second instruction) given to the control valve. Therefore, the response-time length relates to a difference between a valve-opening degree of the control valve before the instruction is given to the control valve and a valve-opening degree of the control valve in accordance with the instruction (hereinafter simply referred to as "difference in the valve-opening degree"). For example, it is thought in general that the smaller the difference in the valve-opening degree is, the shorter the response-time length is. The control device of this embodiment therefore obtains, as the parameter relating to the response-time length, the above "referential difference in the valve-opening degree" and "the referential response-time length" that is required when the valve-opening degree of the control valve changes by that referential difference in the valve-opening degree.

In regard to the control device of this embodiment, the second valve-opening degree may be any of a valve-opening degree that is smaller than the first valve-opening degree and a valve-opening degree that is larger than the first valve-opening degree. Furthermore, the referential difference in the valve-opening degree and the referential response-time length may be a value that is determined through some experiments in advance, a value that is obtained (learned) during actual operation of the engine provided with the control device of this embodiment, and the both of the values.

On the other hand, the response-time length of the control valve may change due to some reasons such as aged deterioration of members that relate to the operation of the control valve. Furthermore, the members may have structural variation (i.e., manufacturing difference in dimensions and performances etc., between same kinds of members). Therefore, the response-time length of the control valve may vary by specific engine. In view of the above, a parameter that is obtained (learned) during actual operation of the engine provided with the control device of this embodiment is preferably employed as the referential response-time length.

Furthermore, the referential response-time length and the referential difference in the valve-opening degree may include unavoidable error in obtaining them (measurement error). Therefore, there may be a case where a control rule of the opening-area that is determined when the referential response-time length and the referential difference in the valve-opening degree are moderately large is more appropriate, from a viewpoint of bringing the energy of the exhaust gas entered into the turbine closer to the target amount, compared with a control rule of the opening-area that is determined when they are excessively small, depending on how to determine the control rule of the opening-area.

Therefore, in regard to the control device of the second embodiment, the control means may be configured to employ the referential response-time length "upon the referential difference in the valve-opening degree is larger than a predetermined threshold value" and the referential difference in the valve-opening degree as the parameter relating to the response-time length.

Next, the internal combustion engine applied with a "third embodiment" of the control device of the present invention has:

a means for obtaining "supercharging pressure", wherein the supercharging pressure is a pressure of air entered into a combustion chamber of the engine after the air is compressed by the compressor;

a means for determining fuel injection amount so as to set the "smaller one" of "a referential amount" of the fuel injection amount determined based on operating condition of the engine and "an upper amount" of the fuel injection amount determined based on a predetermined operation parameter including the supercharging pressure as a "target amount" of the fuel injection amount; and a means for injecting fuel in the combustion chamber by the "target amount."

As "third embodiment" of the control device of the present invention, the control means may be configured to employ "an accumulated amount in the fuel restriction" and "a referential difference in the valve-opening degree" as the parameter relating to the response-time length in the presence of "a fuel restriction period where the upper amount is smaller than the referential amount" between a first time point where an instruction is given to the control valve so as to change the valve-opening degree from a first valve-opening degree to a second valve-opening degree and a second time point where the valve-opening degree of the control valve matches to the second valve-opening degree, wherein the accumulated amount in the fuel restriction is an amount obtained by accumulating difference between the referential amount and the upper amount over the fuel restriction period, and the referential difference in the valve-opening degree is a difference between a magnitude of the first valve-opening degree and a magnitude of the second valve-opening degree.

As described above, "the response-time length of the control valve" relates to the amount of the energy of the exhaust gas entered into the turbine (for example, see the point of view of the difference in energy). Furthermore, the turbine and the compressor are driven by the energy of the exhaust gas entered into the turbine, and then the driven compressor compresses air in the intake air passage. Therefore, the amount of the energy of the exhaust gas entered into the turbine relates to the supercharging pressure. Additionally, the target value of the fuel injection amount is determined in consideration of the operating condition of the engine and the supercharging pressure in the engine of this embodiment. Therefore, the supercharging pressure relates to "the target value of the fuel injection amount."

In view of the above, the response-time length of the control valve relates to the target value of the fuel injection amount in the engine of this embodiment. More specifically, there may be a case that "the upper amount during the fuel restriction period" in consideration of the supercharging pressure is smaller than "the referential amount during the fuel restriction period" in consideration of the operating condition of the engine if the amount of the energy of the exhaust gas entered into the turbine does not match the target amount during a period from a time point where an instruction (second instruction) is given to the control valve so as to change the valve-opening degree thereof to a time point where the response-time length elapses. That is, there may be a case that the fuel injection amount (the target value of the fuel injection amount) is restricted due to the response-time length of the control valve. Therefore, the degree of the restriction in the fuel injection amount relates to the response-time length of the control valve in the case that the fuel injection amount is restricted.

The control device of this embodiment employs the value (the accumulated amount in the fuel restriction) obtained by accumulating "the difference between the referential amount and the upper amount" over "the period in which the fuel injection amount is restricted (the fuel restriction period)" as a degree of the restriction of the fuel injection amount. The control device of this embodiment then employs this accumulated amount in the fuel restriction as one of the parameter relating to the response-time length. This accumulated amount in the fuel restriction may be obtained (learned) during actual operation of the engine provided with the control device of this embodiment.

Furthermore, the referential difference in the valve-opening degree relates to the response-time length (see the second embodiment). Therefore, the control device of this embodiment employs the referential difference in the valve-opening degree as one of the parameter relating to the response-time length.

On the other hand, the accumulated amount in the fuel restriction and the referential difference in the valve-opening degree may include unavoidable error in obtaining them (measurement error), as similar as the second embodiment. Therefore, there may be a case where a control rule of the opening-area that is determined when the accumulated amount in the fuel restriction and the referential difference in the valve-opening degree are moderately large is more appropriate, from a viewpoint of bringing the energy of the exhaust gas entered into the turbine closer to the target amount, compared with a control rule of the opening-area that is determined when they are excessively small, depending on how to determine the control rule of the opening-area.

Therefore, in regard to the control device of the third embodiment, the control means may be configured to employ the accumulated amount in the fuel restriction "upon the referential difference in the valve-opening degree is larger than a predetermined threshold value" and the referential difference in the valve-opening degree as the parameter relating to the response-time length.

More specifically about the above "predetermined threshold value (that is, the first valve-opening degree and the second valve-opening degree)", it may be configured in the first embodiment to the third embodiment that the first valve-opening degree is a valve-opening degree where the "minimum" amount of energy of the exhaust gas is entered into the turbine and the second valve-opening degree is a valve-opening degree where the "maximum" amount of energy of the exhaust gas is entered into the turbine, Furthermore, it may be configured that the first valve-opening degree is a valve-opening degree where the "maximum" amount of energy of the exhaust gas is entered into the turbine and the second valve-opening degree is a valve-opening degree where the "minimum" amount of energy of the exhaust gas is entered into the turbine.

Examples of "the control rule of the opening-area" and "the parameter relating to the response-time length" are described above.

On the other hand, it is thought in regard to the control device of the present invention that the smaller "the target difference in the valve-opening degree" in the second instruction is, the shorter the response-time length of the control valve. Therefore, it is thought that the smaller the target difference in the valve-opening degree is, the shorter the length of the period in which the energy entered into the turbine does not match the target value is. There may be the case that it can be presupposed that the amount of the energy entered into the turbine substantially matches the target value even if the control device does not control the opening-area of the approach zone (that is, the control device does not give the first instruction to the opening-area control member), in the case that the length of the period is sufficiently short.

In view of the above, in regard to the control device of the present invention (including the first embodiment to the third embodiment), the control means gives the first instruction to the opening-area control member "upon the target difference in the valve-opening degree is larger than a predetermined threshold value."

DESCRIPTION OF EMBODIMENTS

Figure 1:
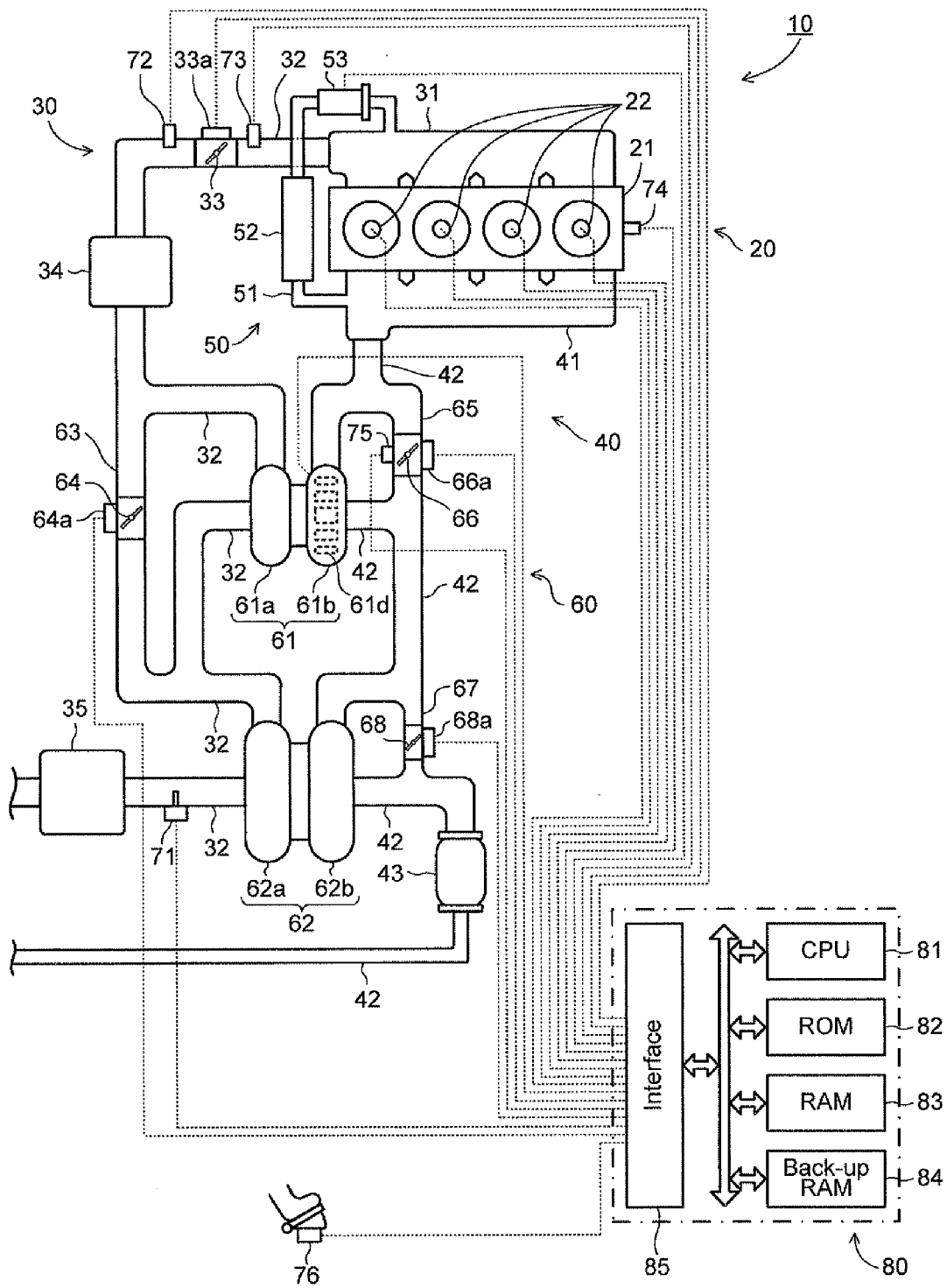
FIG. 1 is a schematic diagram of an internal combustion engine to which a control device according to the first embodiment of the invention is applied.

Hereinafter, respective embodiments of the control device for internal combustion engine of the present invention will be described below by referring to the drawings.

First Embodiment

<Outline of Device>

FIG. 1 illustrates a schematic configuration of a system where a control device according to the first embodiment of the present invention (hereinafter referred to as "first device") is applied to internal combustion engine 10. The internal combustion engine 10 is a four-cylinder diesel engine that has four cylinders of first cylinder to fourth cylinder. Hereinafter, the "internal combustion engine 10" is simply referred to as the "engine 10" for convenience.

As illustrated in FIG. 1, the engine 10 includes an engine body 20 having a fuel injection system, an intake system 30 to introduce air into the engine body 20, an exhaust system 40 to discharge exhaust gas from the engine body 20 to the outside of the engine 10, an EGR device 50 to recirculate the exhaust gas from the exhaust system 40 to the intake system 30, and a supercharging device 60 driven by energy of the exhaust gas to compress air entered into the engine body 20.

The engine body 20 includes a cylinder head 21 to which the intake system 30 and the exhaust system 40 are connected. The cylinder head 21 includes plural fuel injection devices 22 (for example, solenoid-type injectors) that are respectively provided at the upper portions of the respective cylinders so as to correspond to the respective cylinders. The respective fuel injection devices 22 are connected to a fuel tank (not illustrated), and are configured to inject fuel into the combustion chambers of the respective cylinders depending on an instruction signal from an electric control device 80.

The intake system 30 includes an intake manifold 31 that communicates with the respective cylinders through the intake port (not illustrated) formed on the cylinder head 21, an intake pipe 32 that is connected to an assembled portion on the upstream side of the intake manifold 31, a throttle valve (intake throttle valve) 33 that can change opening-area (opening cross-sectional area) in the intake pipe 32, a throttle valve actuator 33a that rotationally operates the throttle valve 33 depending on an instruction signal from the electric control device 80, an intercooler 34 that is interposed in the intake pipe 32 on the upstream side of the throttle valve 33, and an air cleaner 35 that is provided in the end portion of the intake pipe 32 on the upstream side of the supercharging device 60 provided in the upstream of the intercooler 34. The intake manifold 31 and the intake pipe 32 constitute the intake air passage.

The exhaust system 40 includes an exhaust gas manifold 41 that communicates with the respective cylinders through the exhaust port (not illustrated) formed on the cylinder head 21, an exhaust pipe 42 that is connected to an assembled portion on the downstream side of the exhaust gas manifold 41, and a catalyst (for example, DPNR) 43 for purifying the exhaust gas. The catalyst 43 is interposed in the exhaust pipe 42 on the downstream side of the supercharging device 60 provided in the exhaust pipe 42. The exhaust gas manifold 41 and the exhaust pipe 42 constitute the exhaust gas passage.

The EGR device 50 includes an exhaust re-circulation pipe 51 that constitutes a passage (EGR passage) for re-circulating the exhaust gas from the exhaust gas manifold 41 to the intake manifold 31, an EGR gas cooling device (EGR cooler) 52 that is interposed in the exhaust re-circulating pipe 51, and an EGR control valve 53 that is interposed in the exhaust re-circulating pipe 51. The EGR control valve 53 is configured to change the amount of the re-circulated exhaust gas (the amount of the EGR gas) depending on an instruction signal from the electric control device 80.

The supercharging device 60 has a high-pressure supercharger 61 and a low-pressure supercharger 62. Furthermore, the supercharging device 60 has, as members to control exhaust gas and air entered into those superchargers, a high-pressure compressor bypass passage section (bypass pipe) 63, an intake air changeover valve (ACV) 64; a high-pressure turbine bypass passage section (bypass pipe) 65, an exhaust gas changeover valve (ECV) 66; a low-pressure turbine bypass passage section (bypass pipe) 67, and an exhaust gas bypass valve (EBV) 68.

The high-pressure supercharger 61 has a high-pressure compressor 61a, a high-pressure turbine 61b and a variable nozzle mechanism 61c. The high-pressure compressor 61a is provided in the intake air passage (intake pipe 32). The high-pressure turbine 61b is provided in the exhaust gas passage (exhaust pipe 42). The high-pressure compressor 61a and the high-pressure turbine 61b are connected with each other coaxially rotatably through a rotor shaft 61d (see FIG. 2). Accordingly, when the high-pressure turbine 61b is driven by the exhaust gas, the high-pressure compressor 61a rotates. Then, air entered into the high-pressure compressor 61a is compressed (that is, the supercharging is performed). The variable nozzle mechanism 61c is provided around the high-pressure turbine 61b. The variable nozzle mechanism 61c is configured to change the opening-area of an area through which the exhaust gas entered into the high-pressure turbine 61b (hereinafter referred to as "approach zone") depending on an instruction signal from the electric control device 80.

Configuration of the variable nozzle mechanism 61c will be described by referring to FIG. 2. The variable nozzle mechanism 61c has plural blade-shape parts (vanes) 61c1 and a nozzle-shape part (not shown) to enter the exhaust gas into the vanes 61c1. The plural vanes 61c1 is arranged so as to surround the high-pressure turbine 61b. The exhaust gas then is entered into the high-pressure turbine 61b through an area between one vane 61c1 and other vane 61c1 that is next to the one vane 61c1 as the white arrows illustrated in the figure. The area corresponds to the above approach zone.

Respective vanes 61c1 are configured to rotate around a predetermined rotational axis in the range from the position indicated by the solid line to the position indicated by the broken line illustrated in the figure. In addition, all of the vanes 61c1 are configured to rotate in a coordinate manner. For example, the opening-area of the approach zone changes in the range from the area S1 (the opening-area of the approach zone when the vanes 61c1 are in the position illustrated by the solid line in the figure) to the area S2 (the opening-area of the approach zone when the vanes 61c1 are in the position illustrated by the broken line in the figure), when the vanes 61c1 rotate as illustrated in the figure.

As described above, the variable nozzle mechanism 61c changes the opening-area of the approach zone depending on the instruction signal. The amount of the energy of the exhaust gas entered into the high-pressure turbine 61b changes when the opening-area of the approach zone changes, because of changes such as a flow rate of the exhaust gas entered into the high-pressure turbine 61b per unit time, etc.

Referring to FIG. 1 again, the low-pressure supercharger 62 has a low-pressure compressor 62a and a low-pressure turbine 62b. The low-pressure compressor 62a is provided in the intake air passage (intake pipe 32) at an upstream side of the high-pressure compressor 61a. The low-pressure turbine 62b is provided in the exhaust gas passage (exhaust pipe 42) at a downstream side of the high-pressure turbine 61b. The low-pressure compressor 62a and the low-pressure turbine 62b are connected with each other coaxially rotatably through a rotor shaft (not shown). Accordingly, when the low-pressure turbine 62b is driven by the exhaust gas, the low-pressure compressor 62a rotates. Then, air entered into the low-pressure compressor 62a is compressed (that is, the supercharging is performed). In addition, a capacity of the low-pressure turbine 62b is larger than a capacity of the high-pressure turbine 61b.

One end of the high-pressure compressor bypass passage section 63 is connected to the intake air passage (intake pipe 32) between the high-pressure compressor 61a and the low-pressure compressor 62a. The other end of the high-pressure compressor bypass passage section 63 is connected to the intake air passage (intake pipe 32) at a downstream side of the high-pressure compressor 61a. That is, the high-pressure compressor bypass passage section 63 constitutes a passage that bypasses the high-pressure compressor 61a.

The intake air changeover valve 64 is provided in the high-pressure compressor bypass passage section 63. The intake air changeover valve 64 is a butterfly valve. The intake air changeover valve 64 is rotated around a predetermined rotational axis by an intake air changeover valve actuator 64a that is operated depending on an instruction signal from the electric control device 80. The opening-area of the high-pressure compressor bypass passage section 63 changes due to the rotation (the change of the opening-area) of the intake air changeover valve 64.

One end of the high-pressure turbine bypass passage section 65 is connected to the exhaust gas passage (exhaust pipe 42) at an upstream side of the high-pressure turbine 61b. The other end of the high-pressure turbine bypass passage section 65 is connected to the exhaust gas passage (exhaust pipe 42) between the high-pressure turbine 61b and the low-pressure turbine 62b. That is, the high-pressure turbine bypass passage section 65 constitutes a passage that bypasses the high-pressure turbine 61b.

The exhaust gas changeover valve 66 is provided in the high-pressure turbine bypass passage section 65. The exhaust gas changeover valve 66 is a swing-arm valve. The exhaust gas changeover valve 66 is rotated around a predetermined rotational axis by an exhaust gas changeover valve actuator 66a that is operated depending on an instruction signal from the electric control device 80. The opening-area of the high-pressure turbine bypass passage section 65 changes by the rotation (the change of the opening-area) of the exhaust gas changeover valve 66.

For example, the amount of the exhaust gas entered into the high-pressure turbine 61b is small when the valve-opening degree of the exhaust gas changeover valve 66 is large, since the amount of exhaust gas that can pass through the high-pressure turbine bypass passage section 65. To the contrary, the amount of the exhaust gas entered into the high-pressure turbine 61b is large when the valve-opening degree of the exhaust gas changeover valve 66 is small, since the amount of exhaust gas that can pass through the high-pressure turbine bypass passage section 65.

As described above, the exhaust gas changeover valve 66 changes the amount of the exhaust gas (the amount of energy of the exhaust gas) entered into the high-pressure turbine 61b by changing the valve-opening degree thereof depending on the instruction signal.

In this regard, a relationship between a response speed of the exhaust gas changeover valve 66 and a response speed of the variable nozzle mechanism 61c. First of all, a predetermined amount of "the energy entered into the exhaust gas changeover valve 66" is represented as unit energy amount UE. The required amount of change in the valve-opening degree to allow "the exhaust gas changeover valve 66 to change the amount of the energy entered into the high-pressure turbine 61b by the unit energy amount UE" is determined based on the configuration of the exhaust gas changeover valve 66, etc. As similar as the above, the required amount of change in the opening-area of the approach zone (unit change amount) to allow "the variable nozzle mechanism 61c to change the amount of the energy entered into the high-pressure turbine 61b by the unit energy amount UE" is determined based on the configuration of the variable nozzle mechanism 61c, etc.

A required length of time to allow the variable nozzle mechanism 61c to change the opening-area thereof by the unit change amount (that is, the response speed of the variable nozzle mechanism 61c) is faster than a required length of time to allow the exhaust gas changeover valve 66 to change the valve-opening degree thereof by the unit change amount (that is, the response speed of the exhaust gas changeover valve 66).

One end of the low-pressure turbine bypass passage section 67 is connected to the exhaust gas passage (exhaust pipe 42) at an upstream side of the low-pressure turbine 62b as well as between the high-pressure turbine 61b and the low-pressure turbine 62b. The other end of the low-pressure turbine bypass passage section 67 is connected to the exhaust gas passage (exhaust pipe 42) at a downstream side of the low-pressure turbine 62b. That is, the low-pressure turbine bypass passage section 67 constitutes a passage that bypasses the low-pressure turbine 62b.

The exhaust gas bypass valve 68 is provided in the low-pressure turbine bypass passage section 67. The exhaust gas bypass valve 68 is a butterfly valve. The exhaust gas bypass valve 68 is rotated around a predetermined rotational axis by an exhaust gas bypass valve actuator 68a that is operated depending on an instruction signal from the electric control device 80. The opening-area of the low-pressure turbine bypass passage section 67 changes due to the rotation (the change of the opening-area) of the exhaust gas bypass valve 68.

Furthermore, the first device has plural sensors.

More specifically, the first device has an intake air flow sensor 71, an intake air temperature sensor 72, a supercharging pressure sensor 73, a crank position sensor 74, a valve-opening degree sensor 75 for the exhaust gas changeover valve, and an accelerator opening degree sensor 76.

The intake air flow sensor 71 is provided in the intake air passage (intake pipe 32). The intake air flow sensor 71 is configured to output a signal depending on the intake air amount, which is a mass flow rate of the air flowing in the intake pipe 32 (that is, a mass of air entered into the engine 10). A measured value of the intake air amount is obtained based on this signal.

The intake air temperature sensor 72 is provided in the intake air passage (intake pipe 32). The intake air temperature sensor 72 is configured to output a signal depending on the temperature of the intake air flowing through the intake pipe 32. The intake air temperature is obtained based on this signal.

The supercharging pressure sensor 73 is disposed on the intake pipe 32 on the downstream side of the throttle valve 33. The supercharging pressure sensor 73 is configured to output a signal representing the pressure of the air in the intake pipe 32 at the portion where the sensor is provided (that is, the pressure of air supplied into the combustion chamber of the engine 10. In other words, the supercharging pressure by the supercharging device 60). The supercharging pressure Pim is obtained based on this signal.

The crank position sensor 74 is provided near a crank shaft (not illustrated). The crank position sensor 74 is configured to output a signal having a pulse of a narrow width for every 10 degrees rotation of the crank shaft and a pulse of a wide width for every 360 degrees rotation of the crank shaft. A measured value of the number of rotations of the crank shaft per unit time (hereinafter simply referred to as "the engine rotation speed NE") is obtained based on these signals.

The valve-opening degree sensor 75 for the exhaust gas changeover valve is configured to output a signal depending on a valve-opening degree of the exhaust gas changeover valve 66. A valve-opening degree Oecv of the exhaust gas changeover valve 66 is obtained based on this signal.

The accelerator opening degree sensor 76 is provided in an accelerator pedal AP that is operated by the operator of the engine 10. The accelerator opening degree sensor 75 is configured to output a signal depending on the opening degree of the accelerator pedal AP. An accelerator opening degree Accp is obtained based on this signal.

Furthermore, the first device has an electric control device 80.

The electric control device 80 includes a CPU 81, a ROM 82 that stores a program executed by the CPU 81, a table (map), a constant, and etc. in advance, a RAM 83 that temporarily stores data if necessary by the CPU 81, a back-up RAM 84 that stores data in power-on state and keeps the stored data even in power-off state, and an interface 85 that includes an AD converter, and etc. The CPU 81, the ROM 82, the RAM 83, the back-up RAM 84 and the interface 85 are connected each other via a bus.

The interface 85 is connected to the respective sensors, etc., and configured to supply signals from the respective sensors, etc. to the CPU 81. Additionally, the interface 85 is connected to the fuel injection device 22, the plural actuators and the EGR control valve 53, and etc., and configured to send instruction signals to them depending on the command of the CPU 81.

The position (rotational position) of the vanes 61c1 of the variable nozzle mechanism 61c is hereinafter referred to as "opening degree of the variable nozzle."

<Outline of Operations of the Device>

Outline of the operation of the first device applied to the engine 10 will be described below.

The first device obtains "the parameter relating to the response-time length" during actual operation of the engine 10. More specifically, it is presupposed that the operating condition of the engine 10 changes from first operating condition to second operating condition at a first time point when the engine 10 is driven under the first operating condition (wherein the valve-opening degree of the exhaust gas changeover valve 66 is a first valve-opening degree). Due to this change of the operating condition, "an instruction to change the valve-opening degree of the exhaust gas changeover valve 66 to a second valve-opening degree depending on the second operating condition" is given to the exhaust gas changeover valve actuator 66a. Then, the valve-opening degree of the exhaust gas changeover valve 66 matches to the second valve-opening degree at a second time point at which a predetermined length of time elapses from the time point at which the instruction is given to the exhaust gas changeover valve actuator 66a.

Figure 3:
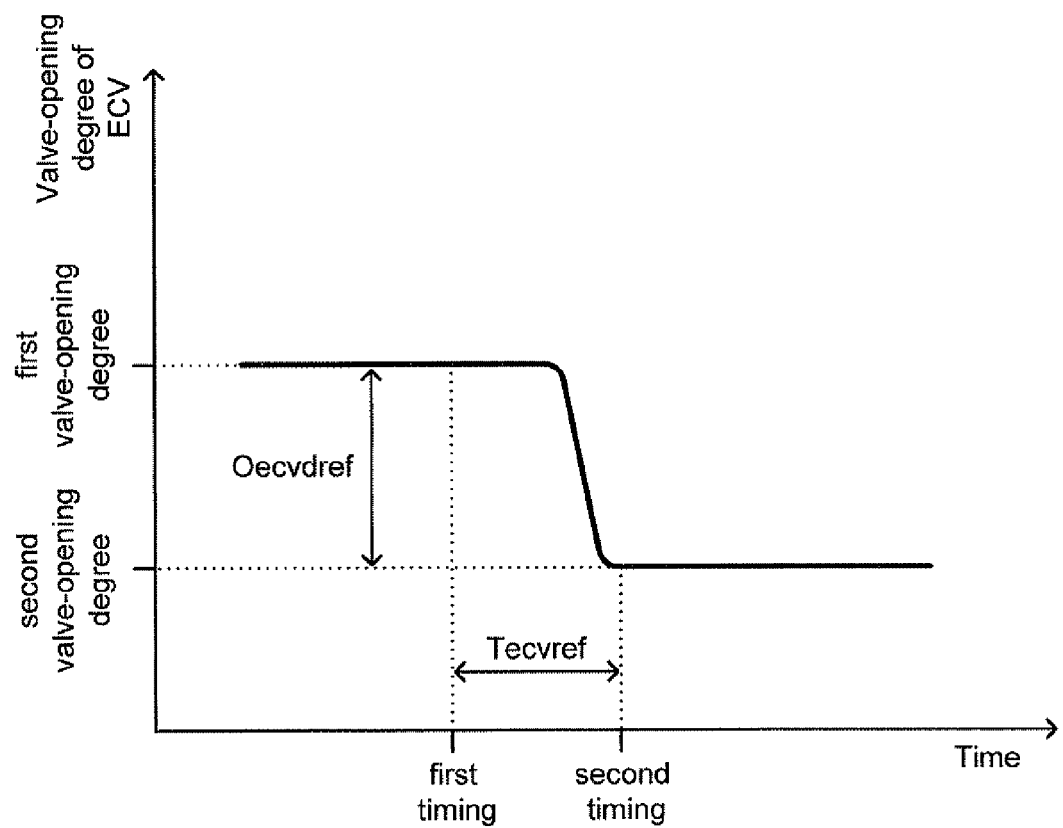
FIG. 3 is a diagram illustrating a relationship of a valve-opening degree of exhaust gas changeover valve 66 with respect to time in the internal combustion engine of FIG. 1.

In this case, as illustrated in FIG. 3, the first device obtains "the length of time from the first time point at which the instruction is given to the exhaust gas changeover valve actuator 66a to the second time point at which the valve-opening degree of the exhaust gas changeover valve 66 matches to a valve-opening degree corresponding to the instruction" as "a referential response-time length Tecvref." Furthermore, the first device obtains "the difference between the first valve-opening degree and the second valve-opening degree" as "a referential difference Oecvdref in the valve-opening degree." The first device employs the referential response-time length Tecvref and the referential difference Oecvdref in the valve-opening degree as the parameter relating to the response-time length.

Next, the first device controls the opening degree of the variable nozzle based on the parameter relating to the response-time length that is obtained as described above. More specifically, "an instruction to change the valve-opening degree of the exhaust gas changeover valve 66 to a third valve-opening degree depending on third operating condition" is given to the exhaust gas changeover valve actuator 66a at a third time point at which the operating condition of the engine 10 changes to a third operating condition after the parameter relating to the response-time length is obtained. That is, an instruction to change the valve-opening degree of the exhaust gas changeover valve 66 by "a target difference in the valve-opening degree" is given to the exhaust gas changeover valve actuator 66a.

In this case, the first device determines a control rule of the opening-area based on the target difference in the valve-opening degree and the parameter relating to the response-time length. More specifically, the first device determines, as the control rule of the opening-area, "a target value of the opening degree of the variable nozzle (a compensation opening-degree of the variable nozzle)" and "a length of time in which an instruction to match the opening degree of the variable nozzle to the target value is given to the variable nozzle mechanism 61c (a length of instruction time of the variable nozzle)."

Then, the first device gives an instruction to match the opening degree of the variable nozzle to "the compensation opening-degree of the variable nozzle" to the variable nozzle mechanism 61c in a period from the third time to a time point at which "the length of instruction time of the variable nozzle" elapses. As described above, the first device controls the opening degree of the variable nozzle in parallel with the change of the valve-opening degree of the exhaust gas changeover valve 66. The above is the outline of operation of the first device.

<How to Determine Turbo Mode>

Turbo mode and a way to determine the turbo mode in the first device will be described below.

The first device selects the high-pressure supercharger 61 and the low-pressure supercharger 62 based on the operating condition of the engine 10. More specifically, the first device controls the exhaust gas changeover valve 66 in such a manner that the exhaust gas is preferentially supplied to the high-pressure supercharger 61, when the amount of the energy of the exhaust gas discharged from the combustion chamber is small (for example, when the load of the engine is small). To the contrary, the first device controls the exhaust gas changeover valve 66 in such a manner that the exhaust gas is preferentially supplied to the low-pressure supercharger 62, when the amount of the energy of the exhaust gas is large (for example, when the load of the engine is large).

Furthermore, the first device controls the amount of air entered into the high-pressure supercharger 61 by controlling the intake air changeover valve 64 based on the operating condition of the engine 10. Additionally, the first device the amount of the energy of the exhaust gas entered into the low-pressure supercharger 62 by controlling the exhaust gas bypass valve 68 based on the operating condition of the engine 10.

That is, the first device controls the intake air changeover valve 64, the exhaust gas changeover valve 66, and the exhaust gas bypass valve 68 (hereinafter referred to as "respective control valves") in such a manner that the an appropriate amount of exhaust gas and an appropriate amount of air are supplied to the high-pressure supercharger 61 and the low-pressure supercharger 62 depending on the operating condition of the engine 10.

In order to perform such controls, the first device divides operating conditions of the engine 10 into four areas (operating areas), and determines operating states of the respective control valves. Each of the operating states is appropriate to each of the four operating areas. "The operating states of respective control valves" are determined based on the turbo mode.

The turbo mode is determined as follows.

Figures 4A, 4B:
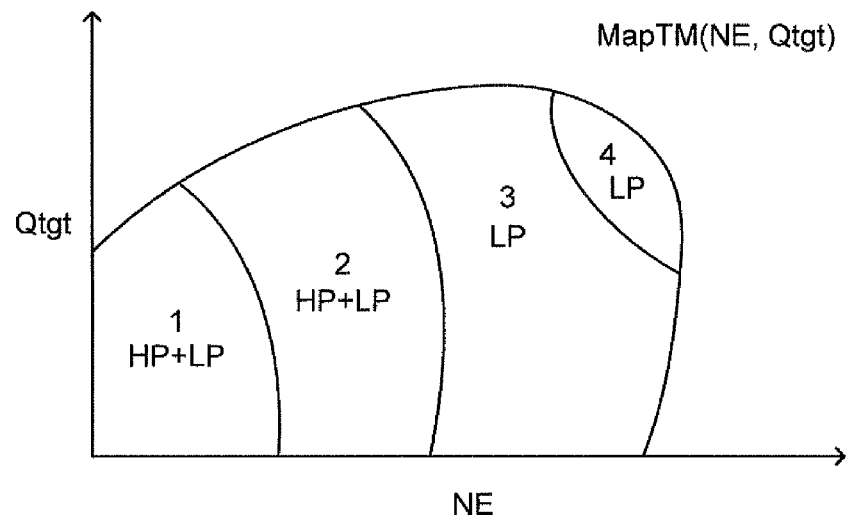
FIG. 4 is a schematic figure illustrating a relation among an engine rotation speed, a fuel injection amount, and a turbo mode, employed by the control device according to the first embodiment of the present invention.

The first device stores "a turbo mode table MapTM(NE, Qtgt) in which a relationship among an engine rotation speed NE, a target value Qtgt in fuel injection amount and a turbo mode is defined in advance" illustrated in FIG. 4(A) in the ROM 82. Each of the numbers "1" to "4" shown in FIG. 4(A) indicates a turbo mode number. "HP+LP" shown in FIG. 4(A) indicates that both of the high-pressure supercharger 61 and the low-pressure supercharger 62 are operated, and "LP" indicates that the low-pressure supercharger 62 is preferentially operated.

FIG. 4(B) illustrates an operating state of respective control valves in each turbo mode. In FIG. 4(B), the "fully close" indicates that a valve-opening degree of the control valve is set at a valve-opening degree to shut down (completely close) a passage in which the control valve is provided, so that the passage is in a condition where the air or the exhaust gas cannot pass through the passage. On the other hand, the "fully open" indicates that the valve-opening degree of the control valve is set at an valve-opening degree to completely open (to its maximum) the passage in which the control valve is provided, so that the passage is in a condition where the air or the exhaust gas can pass through the passage without being substantially affected by the control valve. Furthermore, the "open" indicates that the valve-opening degree of the control valve is set at an valve-opening degree between "the fully close" and "the fully open", so that the passage is in a condition where an amount of the air or an amount of the exhaust gas passing through the passage in which the control valve is provided can be varied depending on the valve-opening degree of the control valve.

In addition, in FIG. 4(B), the "ECV" is an abbreviated name of the exhaust gas changeover valve 66, the "ACV" is an abbreviated name of the intake air changeover valve 64, and the "EBV" is an abbreviated name of the exhaust gas bypass valve 68.

The first device applies an actual engine rotation speed NE and an actual target value Qtgt in the fuel injection amount to the turbo mode Table MapTM(NE, Qtgt) to thereby determine the turbo mode. Then, the first device controls the respective control valves in accordance with the determined turbo mode.

<How to Control the Opening Degree of the Variable Nozzle>

Next, a way to control the supercharging pressure in the first device will be described below.

As described above, the first device controls the opening degree of the variable nozzle in parallel with the change of the valve-opening degree of the exhaust gas changeover valve 66.

Firstly, the change in the opening degree of the variable nozzle when the valve-opening degree of the exhaust gas changeover valve 66 is changed to "decrease" the valve-opening degree is described below by referring to time charts illustrated in FIG. 5 and FIG. 6.

Figure 5:
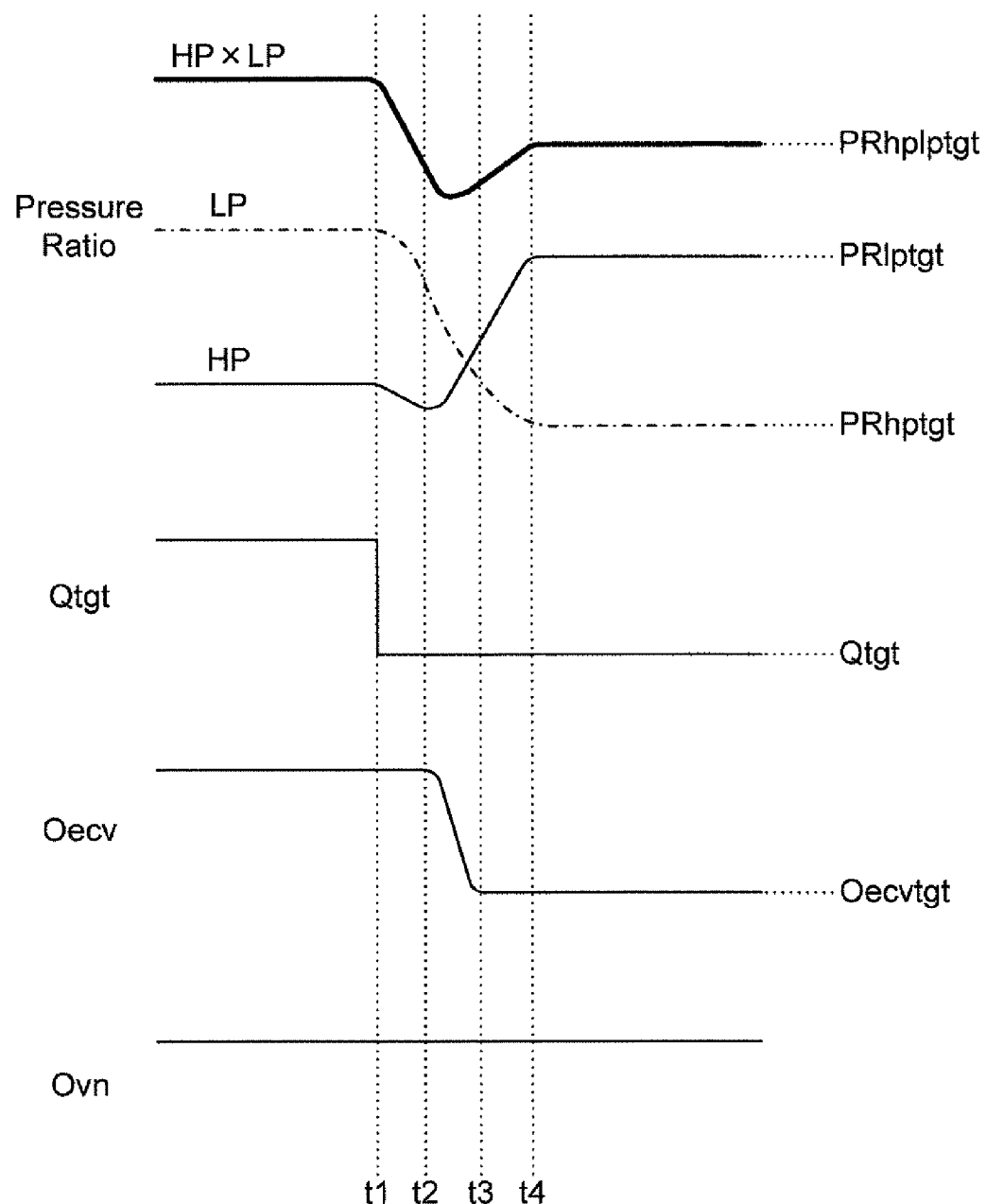
FIG. 5 is a time chart illustrating a fuel injection amount, changes of a valve-opening degree of intake air changeover valve and an opening-area of variable nozzle, and change of pressure ratio of turbine in the internal combustion engine of FIG. 1.
Figure 6:
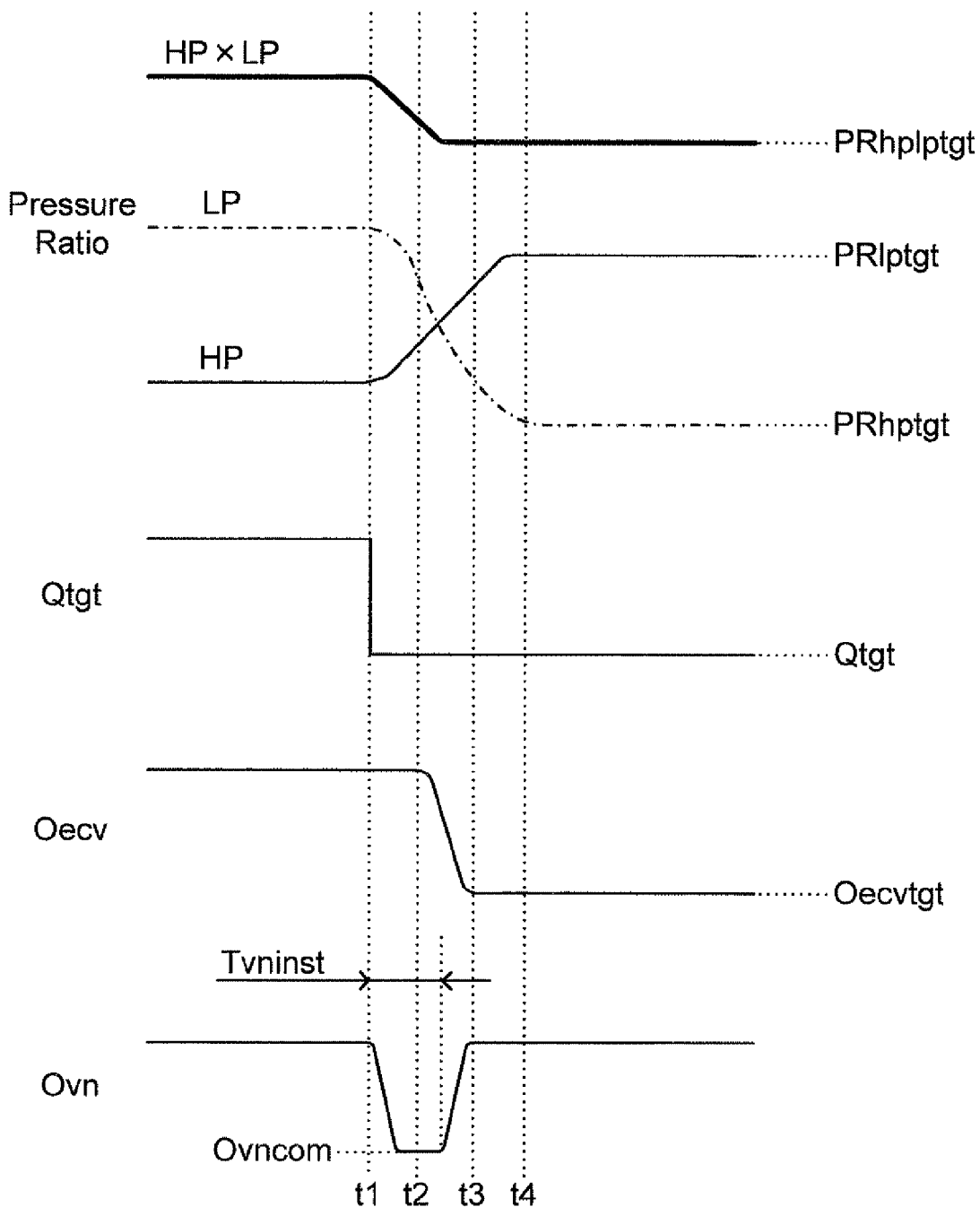
FIG. 6 is a time chart illustrating a fuel injection amount, changes of a valve-opening degree of intake air changeover valve and an opening-area of variable nozzle, and change of pressure ratio of turbine, in the internal combustion engine of FIG. 1.

FIG. 5 illustrates a time chart representing the case that the first device "does not control" the opening degree of the variable nozzle, and FIG. 6 illustrates a time chart representing the case that the first device "control" the opening degree of the variable nozzle.

FIG. 5 illustrates a time chart representing a relationship among pressure ratios of the supercharger (pressure ratio HP by the high-pressure supercharger 61, pressure ratio LP by the low-pressure supercharger 62, and pressure ratio HPxLP by the both), fuel injection amount Q, valve-opening degree Oecv of the exhaust gas changeover valve, and opening degree Ovn of the variable nozzle.

In this regard, the pressure ratio represents "a ratio of a pressure of air after passing through a supercharger with respect to a pressure of air before entering the supercharger." Therefore, the pressure ratio HPxLP represents a ratio of a pressure of air "after passing through the high-pressure supercharger 61" with respect to a pressure of air "before entering the low-pressure supercharger 62." In addition, the supercharging pressure Pim corresponds to a value obtained by multiplying a pressure of air entered into the engine 10 (an atmospheric pressure) by the pressure ratio HPxLP.

As illustrated in this time chart, when the operating condition of the engine 10 changes just before the time point t1, an instruction to change (decrease) the fuel injection amount Q is given to the fuel injection device 22, and an instruction to change (decrease) the opening degree Ovn of the variable nozzle is given to the exhaust gas changeover valve actuator 66a.

The fuel injection device 22 (for example, a solenoid-type injector noted above) can change the fuel injection amount quickly because of its structure. Therefore, the fuel injection amount Q matches an amount Qtgt (hereinafter referred to as "target amount Qtgt") that corresponds to the instruction at the time point t1.

To the contrary, the exhaust gas changeover valve 66 (for example, a swing arm on-off valve noted above) needs a predetermined time to change the valve-opening degree thereof because of its structure. Therefore, the valve-opening degree Oecv starts changing toward the valve-opening degree Oecvtgt (hereinafter referred to as "target valve-opening degree Oecvtgt") that corresponds to the instruction at a time point t2 at which a predetermined length of time elapses from the time point t1. Then, the valve-opening degree Oecv matches to the target valve-opening degree Oecvtgt at a time point t3. "A phenomenon where a predetermined length of time is required from a time point at which an instruction to change the opening degree Oecv of the exhaust gas changeover valve 66 is given to the exhaust gas changeover valve actuator 66a to a time point at which the opening degree Oecv of the exhaust gas changeover valve 66 matches to an opening degree Oecvtgt that corresponds to the instruction" is hereinafter referred to as "a delay of response of the exhaust gas changeover valve 66."

In addition, the first device does not control the opening degree Ovn of the variable nozzle in the example illustrated in FIG. 5 as described above. Therefore, the opening degree Ovn of the variable nozzle is kept at a predetermined opening degree at any time.

The amount of the energy of the exhaust gas discharged from the combustion chamber decreases during the period from the first time point t1 to the second time point t2 since the fuel injection amount Q decreases. On the other hand, the amount of the energy of the exhaust gas entered into the high-pressure turbine 61b decreases during this period since the valve-opening degree Oecv of the exhaust gas changeover valve 66 is kept at the valve-opening degree before the instruction is given to the exhaust gas changeover valve actuator 66a. Therefore, the pressure ratio HP decreases. In this regard, however, the pressure ratio HP does not decrease instantly but decreases gradually since the high-pressure turbine 61b has a predetermined magnitude of inertia moment. Furthermore, the amount of the energy of the exhaust gas entered into the low-pressure turbine 62b decreases for similar reason. Therefore, the pressure ratio LP decreases. In this regard, however, the pressure ratio LP does not decrease instantly but decreases gradually since the low-pressure turbine 62b has a predetermined magnitude of inertia moment.

Next, the amount of the energy of the exhaust gas entered into the high-pressure turbine 61b increases during the period from the second time point t2 to the third time point t3, and the amount of the energy of the exhaust gas entered into the low-pressure turbine 62b decreases during the period, since the valve-opening degree Oecv of the exhaust gas changeover valve 66 decreases.

During the period, the pressure ratio HP increases since the amount of the energy of the exhaust gas entered into the high-pressure turbine 61b increases. In this regard, however, a predetermined time is required from a time point at which the valve-opening degree Oecv of the exhaust gas changeover valve 66 matches to the target valve-opening degree Oecvtgt to a time point at which the pressure ratio HP matches to a pressure ratio PRhptgt corresponding to the target valve-opening degree Oecvtgt (hereinafter referred to as "target pressure ratio PRhptgt"), since the high-pressure turbine 61b has a predetermined magnitude of inertia moment as described above. Therefore, the pressure ratio HP does not yet match to the target pressure ratio PRhptgt at the third time point t3. The pressure ratio HP matches to the target pressure ratio PRhptgt at the fourth time point t4 at which a predetermined length of time elapses from the third time point t3.

On the other hand, the pressure ratio LP decreases since the amount of the energy of the exhaust gas entered into the low-pressure turbine 62b decreases during the period. In this regard, however, a predetermined time is required from a time point at which the valve-opening degree Oecv of the exhaust gas changeover valve 66 matches to the target valve-opening degree Oecvtgt to a time point at which the pressure ratio LP matches to a pressure ratio PRlptgt corresponding to the target valve-opening degree Oecvtgt (hereinafter referred to as "target pressure ratio PRlptgt"), since the low-pressure turbine 62b has a predetermined magnitude of inertia moment as described above. Therefore, the pressure ratio LP does not yet match to the target pressure ratio PRlptgt at the third time point t3. The pressure ratio LP matches to the target pressure ratio PRlptgt near the fourth time point t4 in this example.

The pressure ratio HPxLP starts to decrease at the first time point t1 since the pressure ratio HP and the pressure ratio LP change as described above. The pressure ratio HPxLP continues to decrease during the period from the first time point t1 to a predetermined time point between the second time point t2 and the third time point t3. After the predetermined time point, the pressure ratio HPxLP starts to increase. Then, the pressure ratio HPxLP matches to a pressure ratio PRhplptgt (hereinafter referred to as "target pressure ratio PRhplptgt") corresponding to the operating condition of the engine 10 near the fourth time point t4.

As described above, in the case that the first device "does not control" the opening degree of the variable nozzle, there will be the period (from the first time point t1 to the fourth time point t4) in which the pressure ratio HPxLP does not match to the target pressure ratio PRhplptgt due to at least the delay of response of the exhaust gas changeover valve 66 (the length of time from the first time point t1 to the third time point t3) and the inertia moment of the high-pressure turbine 61b.

In view of the above, the first device controls the opening degree Ovn of the variable nozzle in parallel with the change of the valve-opening degree Oecv of the exhaust gas changeover valve 66. The relationship described below is that among the pressure ratios of the supercharger (pressure ratio HP, pressure ratio LP, and pressure ratio HPxLP), the fuel injection amount Q, the valve-opening degree Oecv of the exhaust gas changeover valve, and the opening degree Ovn of the variable nozzle in the case that the first device "controls" the opening degree of the variable nozzle.

In the time chart illustrated in FIG. 6, when the operating condition of the engine 10 changes just before the time point t1, the similar instructions is given to the fuel injection device 22 and the exhaust gas changeover valve actuator 66a. Due to these instructions, the fuel injection amount Q matches the target amount Qtgt that corresponds to the instruction at the time point t1, the valve-opening degree Oecv matches to the target valve-opening degree Oecvtgt at a time point t3, as similar as the example illustrated in FIG. 5.

When the operating condition of the engine 10 changes, the first device determines "control rule of the opening-area" to control the opening degree Ovn of the variable nozzle based on predetermined parameter relating to the response-time length. The first device then gives an instruction to change the opening degree Ovn of the variable nozzle to the variable nozzle mechanism 61c in accordance with the control rule of the opening-area.

In this example, the first device determines, as the control rule of the opening-area, "a compensation opening degree Ovncom of the opening degree Ovn of the variable nozzle" and "a length of instruction time Tvninst in which an instruction to match the opening degree Ovn of the variable nozzle to the compensation opening degree Ovncom is given to the variable nozzle mechanism 61c." The compensation opening degree Ovncom and the length of instruction time Tvninst in this example are set at appropriate values by which the delay of response of the exhaust gas changeover valve 66 can be compensated. Then, the first device gives the above instruction to the variable nozzle mechanism 61c in a period from the first time point t1 as the start time point to a time point at which the length of instruction time Tvninst elapses, as illustrated in FIG. 6.

The amount of the energy of the exhaust gas discharged from the combustion chamber decreases during the period from the first time point t1 to the second time point t2, and the valve-opening degree Oecv of the exhaust gas changeover valve 66 is kept at the valve-opening degree before the instruction is given to the exhaust gas changeover valve actuator 66a, as similar as the example illustrated in FIG. 5. In this example, however, a flow velocity of the exhaust gas (the amount of the energy of the exhaust gas) entered into the high-pressure turbine 61b increases since the opening degree Ovn of the variable nozzle decreases. Thereby, the pressure ratio HPxLP in this example does not decrease as illustrated in the time chart of FIG. 5 but increases.

In addition, it is presupposed for convenience that the change in the opening degree Ovn of the variable nozzle has an influence on only the compensation of the delay of response of the exhaust gas changeover valve 66 (that is, only the pressure ratio HP) and does not have substantial influence on the pressure ratio LP. In accordance with this presumption, the pressure ratio LP in this example decreases as similar as the time chart illustrated in FIG. 5.

Next, the amount of the energy of the exhaust gas entered into the high-pressure turbine 61b increases during the period from the second time point t2 to the third time point t3, and the amount of the energy of the exhaust gas entered into the low-pressure turbine 62b decreases during the period, as similar as the example illustrated in FIG. 5. In addition, the opening degree Ovn of the variable nozzle increases during this period.

During the period, the pressure ratio HP increases since the amount of the energy of the exhaust gas entered into the high-pressure turbine 61b increases. In this regard, however, the pressure ratio HP matches to the target pressure ratio PRhptgt at an earlier time point (than the fourth time point t4) compared with the time point in the example illustrated in FIG. 5 since the delay of response of the exhaust gas changeover valve 66 is compensated by the change in the opening degree Ovn of the variable nozzle.

In addition, the pressure ratio LP matches to the target pressure ratio PRlptgt near the fourth time point t4 as similar as the example illustrated in FIG. 5 since the change in the opening degree Ovn of the variable nozzle does not have substantial influence on the pressure ratio LP, as described above.

The pressure ratio HPxLP starts to decrease at the first time point t1 since the pressure ratio HP and the pressure ratio LP change as described above. The pressure ratio HPxLP, however, matches to the target pressure ratio PRhplptgt at an earlier time point (than the fourth time point t4) compared with the time point in the example illustrated in FIG. 5. Furthermore, the pressure ratio HPxLP in this example matches to the target pressure ratio PRhplptgt without the temporal decrease as the time chart illustrated in FIG. 5.

As described above, in the case that the first device "controls" the opening degree of the variable nozzle, the pressure ratio HPxLP matches to the target pressure ratio PRhplptgt earlier than the case that the first device "does not control" the opening degree of the variable nozzle since the delay of response of the exhaust gas changeover valve 66 is compensated by the decrease of the opening degree Ovn of the variable nozzle. That is, the length of the period in which the pressure ratio HPxLP does not match to the target pressure ratio PRhplptgt in this case decreases compared with the case that the first device "does not control" the opening degree of the variable nozzle.

As a result of the above control, the drivability of the engine 10 can be improved since the length of time in which the supercharging pressure Pim (which corresponds to a value obtained by multiplying an atmospheric pressure by the pressure ratio HPxLP) does not match to the target value. Furthermore, the amount of emissions can be decreased.

The above is the description about the change in the opening degree of the variable nozzle in the case that the valve-opening degree of the exhaust gas changeover valve 66 is changed to "decrease" it. Next, the change in the opening degree of the variable nozzle in the case that the valve-opening degree of the exhaust gas changeover valve 66 is changed to "increase" it is described below.

Figure 7:
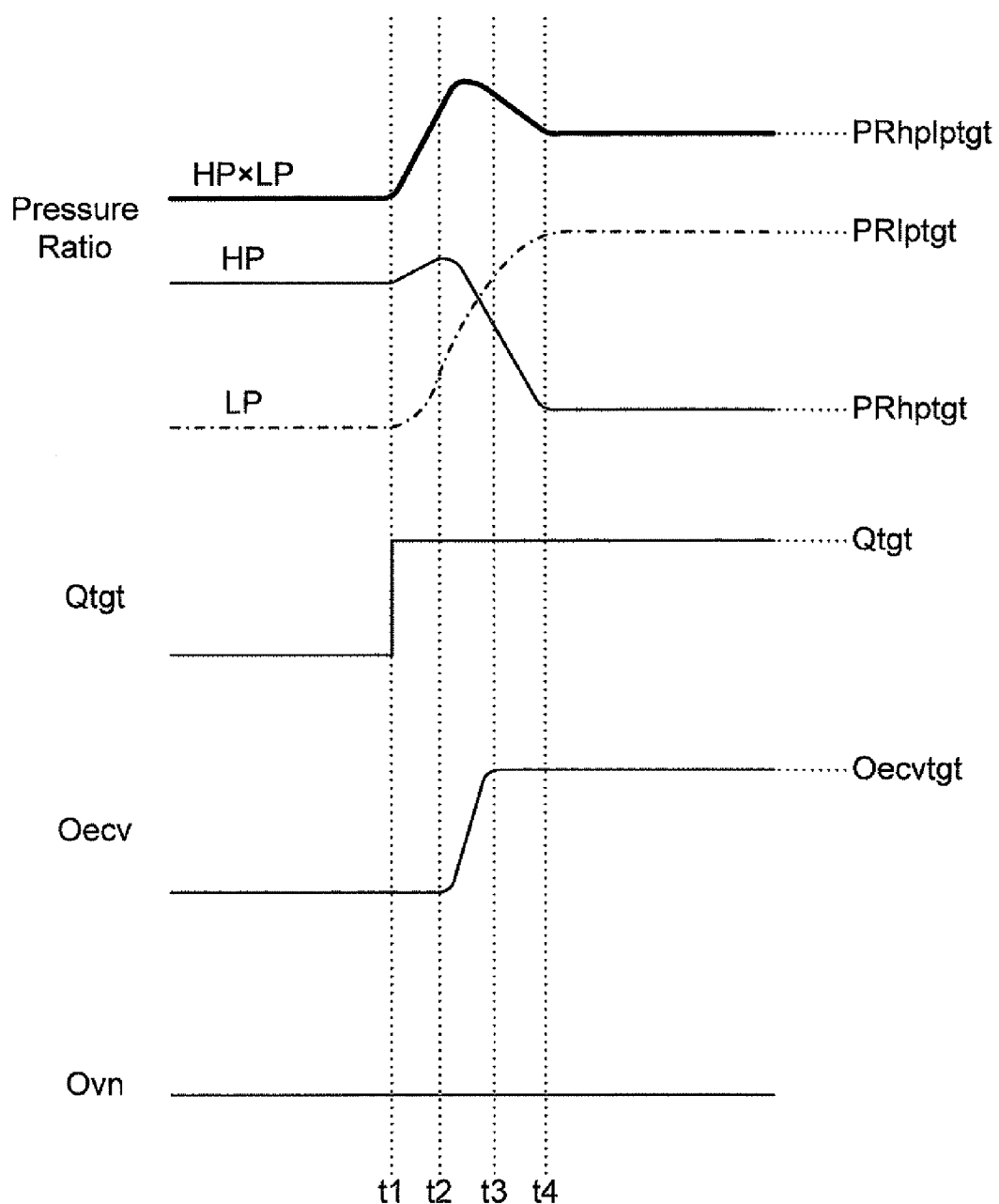
FIG. 7 is a time chart illustrating a fuel injection amount, changes of a valve-opening degree of intake air changeover valve and an opening-area of variable nozzle, and change of pressure ratio of turbine, in the internal combustion engine of FIG. 1.
Figure 8:
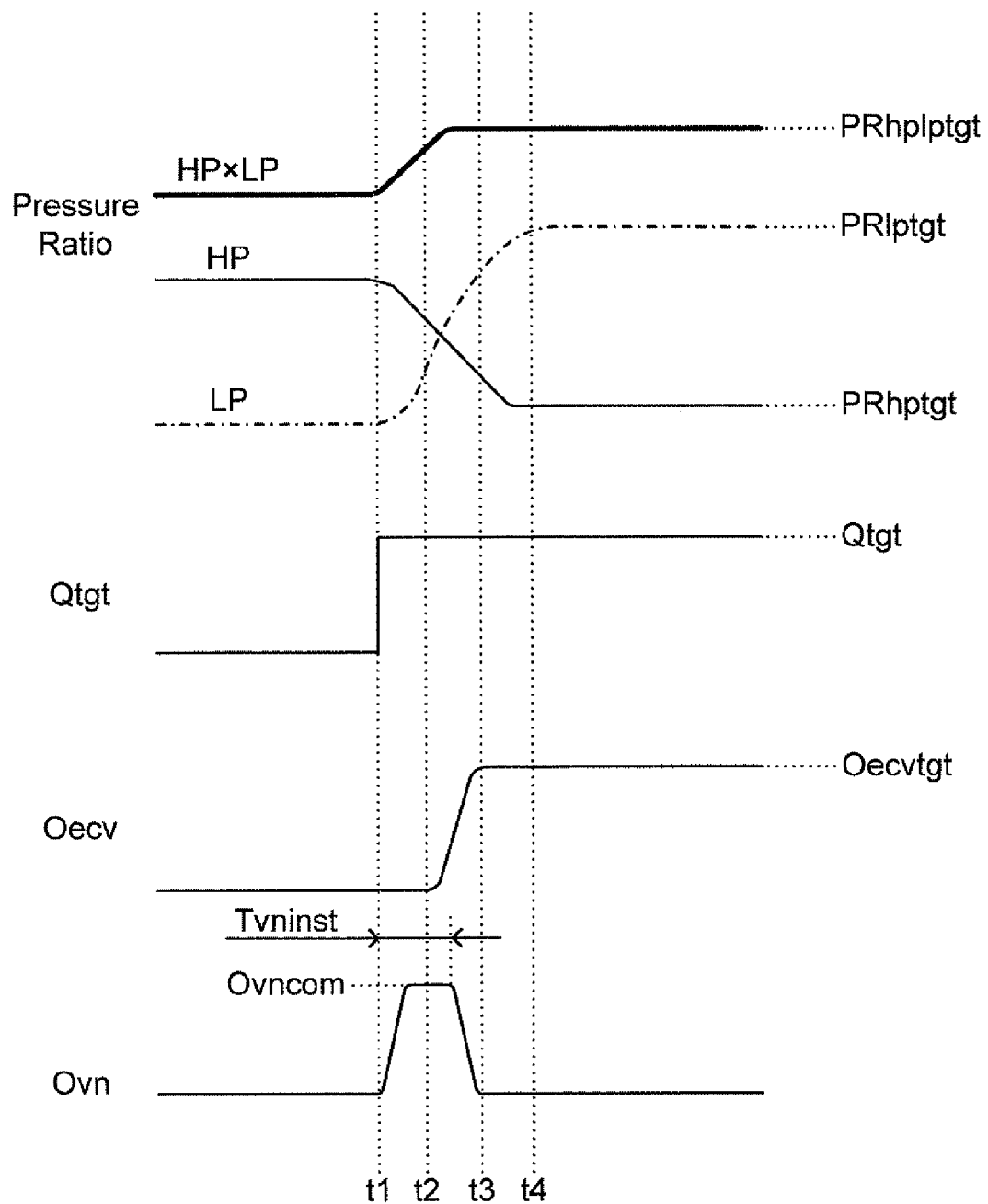
FIG. 8 is a time chart illustrating a fuel injection amount, changes of a valve-opening degree of intake air changeover valve and an opening-area of variable nozzle, and change of pressure ratio of turbine, in the internal combustion engine of FIG. 1.

FIG. 7 illustrates a time chart representing the case that the first device "does not control" the opening degree of the variable nozzle, and FIG. 8 illustrates a time chart representing the case that the first device "control" the opening degree of the variable nozzle. FIG. 7 and FIG. 8 illustrate time charts representing the relationship among the pressure ratios of the supercharger (pressure ratio HP, pressure ratios LP, and pressure ratio HPxLP), the fuel injection amount Q, the valve-opening degree Oecv of the exhaust gas changeover valve, and the opening degree Ovn of the variable nozzle.

As illustrated in the time chart illustrated in FIG. 7, when the operating condition of the engine 10 changes just before the time point t1, an instruction to change (increase) the fuel injection amount Q is given to the fuel injection device 22, and an instruction to change (increase) the opening degree Ovn of the variable nozzle is given to the exhaust gas changeover valve actuator 66a. In addition, the first device does not control the opening degree Ovn of the variable nozzle in the example illustrated in FIG. 7. Therefore, the opening degree Ovn of the variable nozzle is kept at a predetermined opening degree at any time.

The amount of the energy of the exhaust gas discharged from the combustion chamber increases during the period from the first time point t1 to the second time point t2 since the fuel injection amount Q increases. On the other hand, the amount of the energy of the exhaust gas entered into the high-pressure turbine 61b increases during this period since the valve-opening degree Oecv of the exhaust gas changeover valve 66 is kept at the valve-opening degree before the instruction is given to the exhaust gas changeover valve actuator 66a. Therefore, the pressure ratio HP increases. Furthermore, the amount of the energy of the exhaust gas entered into the low-pressure turbine 62b increases for similar reason. Therefore, the pressure ratio LP increases. In this regard, however, the pressure ratio HP and the pressure ratio LP do not increase instantly but increases gradually since the high-pressure turbine 61b and the low-pressure turbine 62b have predetermined magnitude of inertia moments.

Next, the amount of the energy of the exhaust gas entered into the high-pressure turbine 61b decreases during the period from the second time point t2 to the third time point t3, and the amount of the energy of the exhaust gas entered into the low-pressure turbine 62b increases during the period, since the valve-opening degree Oecv of the exhaust gas changeover valve 66 increases.

During the period, the pressure ratio HP decreases since the amount of the energy of the exhaust gas entered into the high-pressure turbine 61b decreases. In this regard, however, the pressure ratio HP does not yet match to the target pressure ratio PRhptgt at the third time point t3 since the high-pressure turbine 61b has the predetermined magnitude of inertia moment as described above. The pressure ratio HP matches to the target pressure ratio PRhptgt at the fourth time point t4 at which a predetermined length of time elapses from the third time point t3.

On the other hand, the pressure ratio LP increases since the amount of the energy of the exhaust gas entered into the low-pressure turbine 62b increases during the period. In this regard, however, the pressure ratio LP does not yet match to the target pressure ratio PRlptgt at the third time point t3 since the low-pressure turbine 62b has the predetermined magnitude of inertia moment as described above. The pressure ratio LP matches to the target pressure ratio PRlptgt near the fourth time point t4 in this example.

The pressure ratio HPxLP starts to increase at the first time point t1 since the pressure ratio HP and the pressure ratio LP change as described above. The pressure ratio HPxLP continues to increase during the period from the first time point t1 to a predetermined time point between the second time point t2 and the third time point t3. After the predetermined time point, the pressure ratio HPxLP starts to decrease. Then, the pressure ratio HPxLP matches to the target pressure ratio PRhplptgt near the fourth time point t4.

As described above, in the case that the first device "does not control" the opening degree of the variable nozzle, there will be the period (from the first time point t1 to the fourth time point t4) in which the pressure ratio HPxLP does not match to the target pressure ratio PRhplptgt due to at least the delay of response of the exhaust gas changeover valve 66 (the length of time from the first time point t1 to the third time point t3) and the inertia moment of the high-pressure turbine 61b.

In view of the above, the first device controls the opening degree Ovn of the variable nozzle in parallel with the change of the valve-opening degree Oecv of the exhaust gas changeover valve 66. The relationship described below is that among the pressure ratios of the supercharger (pressure ratio HP, pressure ratio LP, and pressure ratio HPxLP), the fuel injection amount Q, the valve-opening degree Oecv of the exhaust gas changeover valve, and the opening degree Ovn of the variable nozzle in the case that the first device "controls" the opening degree of the variable nozzle.

In the time chart illustrated in FIG. 8, when the operating condition of the engine 10 changes just before the time point t1, the similar instructions is given to the fuel injection device 22 and the exhaust gas changeover valve actuator 66a. Due to these instructions, the fuel injection amount Q matches the target amount Qtgt that corresponds to the instruction at the time point t1, the valve-opening degree Oecv matches to the target valve-opening degree Oecvtgt at a time point t3, as similar as the example illustrated in FIG. 7.

When the operating condition of the engine 10 changes, the first device determines the "control rule of the opening-area" to control the opening degree Ovn of the variable nozzle based on the predetermined parameter relating to the response-time length. The first device then gives an instruction to change the opening degree Ovn of the variable nozzle to the variable nozzle mechanism 61c in accordance with the control rule of the opening-area.

In this example, the first device determines, as the control rule of the opening-area, "the a compensation opening degree Ovncom of the opening degree Ovn of the variable nozzle" and "the length of instruction time Tvninst in which an instruction to match the opening degree Ovn of the variable nozzle to the compensation opening degree Ovncom is given to the variable nozzle mechanism 61c." The compensation opening degree Ovncom and the length of instruction time Tvninst in this example are set at appropriate values by which the delay of response of the exhaust gas changeover valve 66 can be compensated. Then, the first device gives the above instruction to the variable nozzle mechanism 61c in a period from the first time point t1 as the start time point to a time point at which the length of instruction time Tvninst elapses, as illustrated in FIG. 8.

The amount of the energy of the exhaust gas discharged from the combustion chamber increases during the period from the first time point t1 to the second time point t2, and the valve-opening degree Oecv of the exhaust gas changeover valve 66 is kept at the valve-opening degree before the instruction is given to the exhaust gas changeover valve actuator 66a, as similar as the example illustrated in FIG. 7. In this example, however, a flow velocity of the exhaust gas (the amount of the energy of the exhaust gas) entered into the high-pressure turbine 61b decreases since the opening degree Ovn of the variable nozzle increases. Thereby, the pressure ratio HPxLP in this example does not increase as illustrated in the time chart of FIG. 7 but decreases.

In addition, it is presupposed for convenience that the change in the opening degree Ovn of the variable nozzle has an influence on only the compensation of the delay of response of the exhaust gas changeover valve 66 (that is, only the pressure ratio HP) and does not have substantial influence on the pressure ratio LP. In accordance with this presumption, the pressure ratio LP in this example increases as similar as the time chart illustrated in FIG. 7.

Next, the amount of the energy of the exhaust gas entered into the high-pressure turbine 61b decreases during the period from the second time point t2 to the third time point t3, and the amount of the energy of the exhaust gas entered into the low-pressure turbine 62b increases during the period, as similar as the example illustrated in FIG. 7. In addition, the opening degree Ovn of the variable nozzle decreases during this period.

During the period, the pressure ratio HP decreases since the amount of the energy of the exhaust gas entered into the high-pressure turbine 61b decreases. In this regard, however, the pressure ratio HP matches to the target pressure ratio PRhptgt at an earlier time point (than the fourth time point t4) compared with the time point in the example illustrated in FIG. 7 since the delay of response of the exhaust gas changeover valve 66 is compensated by the change in the opening degree Ovn of the variable nozzle.

In addition, the pressure ratio LP matches to the target pressure ratio PRlptgt near the fourth time point t4 as similar as the example illustrated in FIG. 7 since the change in the opening degree Ovn of the variable nozzle does not have substantial influence on the pressure ratio LP, as described above.

The pressure ratio HPxLP starts to increase at the first time point t1 since the pressure ratio HP and the pressure ratio LP change as described above. The pressure ratio HPxLP, however, matches to the target pressure ratio PRhplptgt at an earlier time point (than the fourth time point t4) compared with the time point in the example illustrated in FIG. 7. Furthermore, the pressure ratio HPxLP in this example matches to the target pressure ratio PRhplptgt without the temporal increase as the time chart illustrated in FIG. 7.

As described above, in the case that the first device "controls" the opening degree of the variable nozzle, the pressure ratio HPxLP matches to the target pressure ratio PRhplptgt earlier than the case that the first device "does not control" the opening degree of the variable nozzle since the delay of response of the exhaust gas changeover valve 66 is compensated by the increase of the opening degree Ovn of the variable nozzle. That is, the length of the period in which the pressure ratio HPxLP does not match to the target pressure ratio PRhplptgt in this case decreases compared with the case that the first device "does not control" the opening degree of the variable nozzle.

As a result of the above control, the drivability of the engine 10 can be improved since the length of time in which the supercharging pressure Pim does not match to the target value. Furthermore, the amount of emissions can be decreased. Additionally, excessive load on some members constituting the engine 10 can be avoided since excessive increase of the supercharging pressure Pim is prevented.

As described above, the first device can quickly match the pressure ratio HPxLP to the target pressure ratio PRhplptgt even in the case that the valve-opening degree Oecv of the exhaust gas changeover valve 66 increases or decreases due to the change of the operating condition of the engine 10. Furthermore, the first device can decrease the length of time in which the pressure ratio HPxLP does not matches to the target pressure ratio PRhplptgt.

In other words, the first device can match the amount of the energy of the exhaust gas entered into the high-pressure turbine 61b to the target value quickly and decrease the length of time in which the amount of the energy does not match to the target value as well. The above is how to control the supercharging pressure in the first device.

In addition, the fuel injection amount Q is changed due to the change of the operating condition of the engine 10. As become clear from the above description, however, the first device can bring the energy of the exhaust gas entered into the high-pressure turbine 61b closer to the target value quickly by controlling the opening degree Ovn of the variable nozzle, whether or not the fuel injection amount Q is changed when the operating condition of the engine 10 changes.

Furthermore, the engine 10 has plural superchargers (the high-pressure supercharger 61 and the low-pressure supercharger 62) in the examples illustrated in FIG. 5 to FIG. 8. As become clear from the above description, however, the first device can bring the energy of the exhaust gas entered into the turbine of the supercharger closer to the target value quickly by controlling the opening degree Ovn of the variable nozzle, regardless of the number of the superchargers (for example, the engine has only one supercharger).

<Actual Operation>

Hereinafter, an actual operation of the first device will be described.

The CPU 81 in the first device is configured to execute the respective routines indicated by the flowcharts in FIG. 9 to FIG. 12 every predetermined timing. In these routines, the CPU 81 uses a response-time length determination flag XRTC.

When the response-time length determination flag XRTC is "0", it indicates that the parameters relating to the response-time length (that is, the referential difference Oecvdref in the valve-opening degree and the referential response-time length Tecvref) have not yet obtained. On the other hand, when the response-time length determination flag XRTC is "1", it indicates that the parameters relating to the response-time length have already obtained.

The value of the response-time length determination flag XRTC is set to "zero" when a predetermined operation is performed on the electric control device 80 through a factory default setting of a vehicle equipped with the engine 10 and a service maintenance, etc.

Hereinafter, the respective routines executed by the CPU 81 will be described in detail.

Firstly, it is presupposed that the value of the response-time length determination flag XRTC is set at "0" at the present moment. Hereinafter, this setting is referred to as "precondition for default setting."

Figure 9:
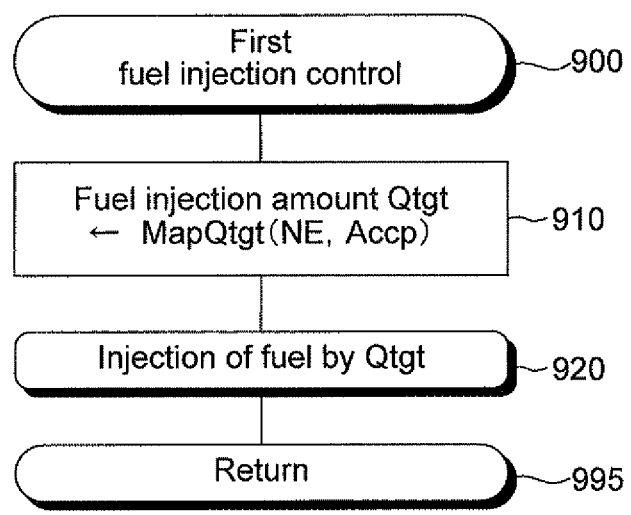
FIG. 9 is a flowchart illustrating a routine executed by a CPU of the control device according to the first embodiment of the present invention.

The CPU 81 is configured to repeatedly execute the "first fuel injection control routine" illustrated in the flowchart in FIG. 9 every time the crank angle of arbitrary cylinder becomes equal to a predetermined crank angle before the compression top dead center (for example, the crank angle of 90 degrees before the compression top dead center) θf. By this routine, the CPU 81 determines the target value Qtgt in the fuel injection amount and instructs the fuel injection device 22 to inject fuel by the target value Qtgt in the cylinder. The cylinder in which the crank angle is equal to the predetermined crank angle θf before the compression top dead center during the compression stroke is hereinafter referred to as "fuel injection cylinder."

Specifically, the CPU 81 starts the processing at the step 900 of FIG. 9 when the crank angle of arbitrary cylinder becomes to the crank angle θf, and then proceeds toward the step 910. At the step 910, the CPU 81 determines the target value Qtgt in the fuel injection amount by applying an engine rotation speed NE and an accelerator opening degree Accp at the present moment to a table MapQtgt(NE, Accp) for defining the target value of the fuel injection amount. The table defines "the relationship among the engine rotation speed NE, the accelerator opening degree Accp, and the target value Qtgt of the fuel injection amount" in advance, In the step 910, a value obtained by the crank position sensor 74 is employed as the engine rotation speed NE. Furthermore, a value obtained by the accelerator opening degree sensor 76 is employed as the accelerator opening degree Accp. Additionally, in the table MapQtgt(NE, Accp) for defining the target value of the fuel injection amount, the target value Qtgt of the fuel injection amount is determined to be an appropriate value that is set depending on an output torque, a fuel efficiency and an amount of emissions (such as particle matters and nitrogen oxide in the exhaust gas) required for the engine 10.

Next, the CPU 81 proceeds to the step 920. At the step 920, the CPU 81 gives an instruction to the fuel injecting device 22 that is provided at the fuel injection cylinder so as to inject fuel by the target value Qtgt. That is, the fuel by the target value Qtgt is injected into the fuel injection cylinder. After that, the CPU 81 proceeds to the step 995 so as to end this routine once.

Figure 10:
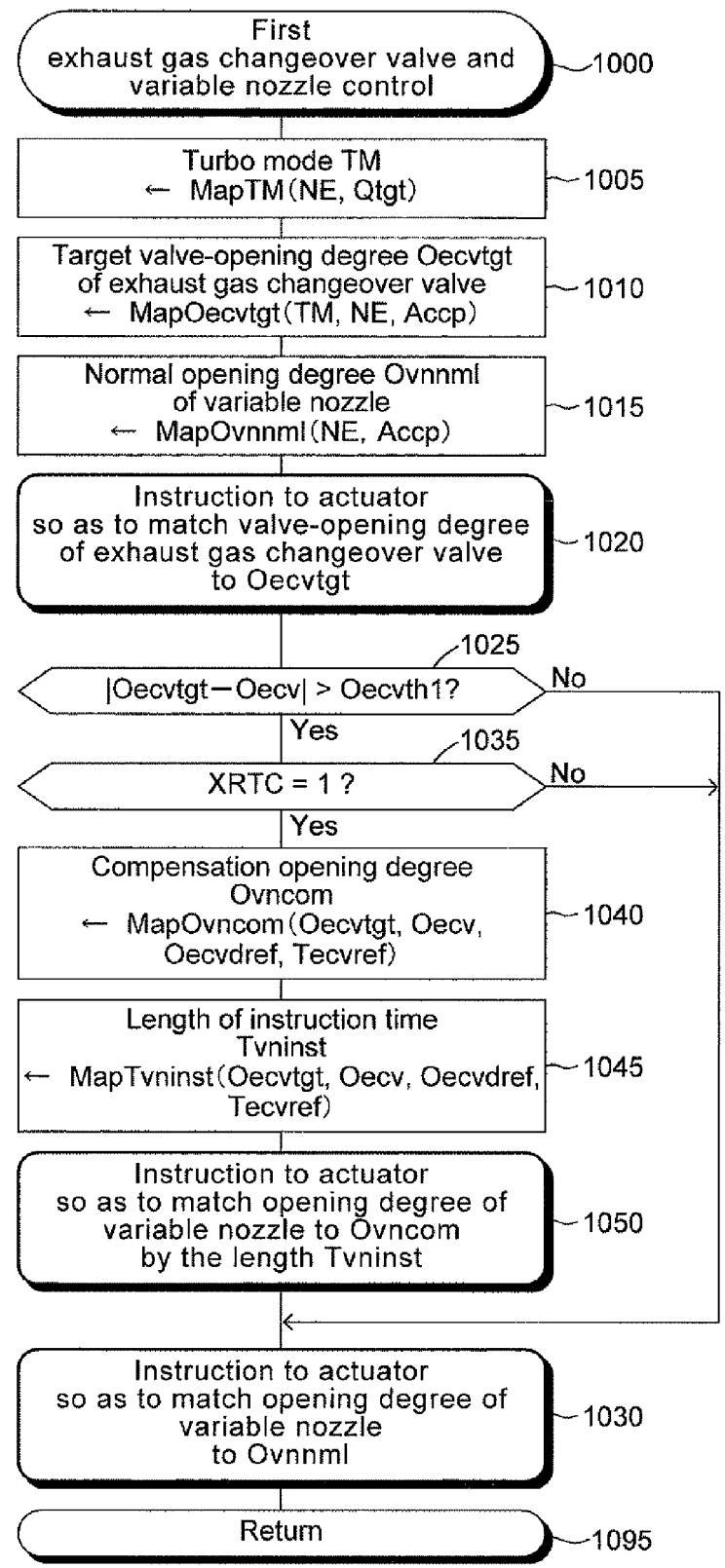
FIG. 10 is a flowchart illustrating a routine executed by a CPU of the control device according to the first embodiment of the present invention.

Furthermore, the CPU 81 is configured to repeatedly execute the "first exhaust gas changeover valve and variable nozzle control routine" illustrated in FIG. 10 every predetermined time. The CPU 81 controls the valve-opening degree Oecv of the exhaust gas changeover valve 66 and the opening degree Ovn of the variable nozzle.

Specifically, the CPU 81 starts the processing at the step 1000 of FIG. 10 at a predetermined timing and then proceeds to the step 1005. At the step 1005, the CPU 81 determines the turbo mode TM by applying the engine rotation speed NE and the target value Qtgt in the fuel injection amount at the present moment to the turbo mode table MapTM(NE, Qtgt) described above (see FIG. 4).

Next, the CPU 81 proceeds to the step 1010. At the step 1010, the CPU 81 determines the target valve-opening degree Oecvtgt of the exhaust gas changeover valve 66 by applying an turbo mode TM, an engine rotation speed NE and an accelerator opening degree Accp at the present moment to a table MapOecvtgt(TM, NE, Accp) for defining the target valve-opening degree of the exhaust gas changeover valve. The table defines "the relationship among the turbo mode TM, the engine rotation speed NE, the accelerator opening degree Accp, and the target valve-opening degree Oecvtgt of the exhaust gas changeover valve 66" in advance.

In the table MapOecvtgt (TM, NE, Accp) for defining the target valve-opening degree of the exhaust gas changeover valve, the target valve-opening degree Oecvtgt of the exhaust gas changeover valve 66 is determined to be an appropriate value that is set depending on an output torque, etc., required for the engine 10.

Next, the CPU 81 proceeds to the step 1015. At the step 1015, the CPU 81 determines the opening degree Ovnnml of the variable nozzle during normal operation by applying an engine rotation speed NE and an accelerator opening degree Accp at the present moment to a table MapOvnnml(NE, Accp) for defining the opening degree of the variable nozzle during normal operation. The table defines "the relationship among the engine rotation speed NE, the accelerator opening degree Accp, and the opening degree Ovnnml of the variable nozzle during normal operation" in advance. The opening degree Ovnnml of the variable nozzle during normal operation is hereinafter referred to as "normal opening degree Ovnnml."

At the step 1015, the normal operation represents an operation that is performed while the operation on which "the first device controls the opening degree Ovn of the variable nozzle in consideration of the response-time length of the exhaust gas changeover valve 66" is "not" performed. In addition, the opening degree Ovn of the variable nozzle while the above operation is performed is described below. Furthermore, in the table MapOvnnml(NE, Accp) for defining the opening degree of the variable nozzle during normal operation, the normal opening degree Ovnnml is determined to be an appropriate value that is set depending on an output torque, etc., required for the engine 10.

Next, the CPU 81 proceeds to the step 1020. At the step 1020, the CPU 81 gives an instruction to the exhaust gas changeover valve actuator 66a so as to match the valve-opening degree of the exhaust gas changeover valve 66 to the target valve-opening degree Oecvtgt. In addition, the time point at which the processing of the step 1020 is executed corresponds to "the first time point t1" in FIG. 6.

Next, the CPU 81 proceeds to the step 1025. The CPU 81 determines whether or not the absolute value of the difference between the target valve-opening degree Oecvtgt of the exhaust gas changeover valve 66 and the valve-opening degree Oecv of the exhaust gas changeover valve 66 at the present moment is larger than a predetermined threshold value Oecvth1.

When the "absolute value of the difference" at the present moment is equal to or smaller than the threshold value Oecvth1, the CPU 81 makes the "No" determination at step 1025 and proceeds to the step 1030. At the step 1030, the CPU 81 gives an instruction to the variable nozzle mechanism 61c so as to match the opening degree of the variable nozzle to the normal opening degree Ovnnml. In addition, the time point at which the processing of the step 1030 is executed coincides with the time point at which the processing of the step 1020 is executed (the time point t1 in FIG. 6) substantially. After that, the CPU 81 proceeds to the step 1095 so as to end this routine once.

To the contrary, when the "absolute value of the difference" at the present moment is larger than the threshold value Oecvth1, the CPU 81 makes the "Yes" determination at step 1025 and proceeds to the step 1035. At the step 1035, the CPU 81 determines whether or not the value of the response-time length determination flag XRTC is "1." The value of the response-time length determination flag XRTC at the present moment is "0", in accordance with the precondition for default setting, then the CPU 81 makes the "No" determination at step 1035 and proceeds to step 1030.

The CPU 81 then sends the above instruction to the variable nozzle mechanism 61c at the step 1030 and proceeds to the step 1095 so as to end this routine once.

As described above, the instruction is sent to the exhaust gas changeover valve actuator 66a so as to match the valve-opening degree of the exhaust gas changeover valve 66 to the target valve-opening degree Oecvtgt, when the absolute value of the difference between the valve-opening degree Oecv of the exhaust gas changeover valve 66 at the present moment and the target valve-opening degree Oecvtgt is equal to or smaller than the threshold value Oecvth1. Furthermore, the instruction is sent to the variable nozzle mechanism 61c so as to match the opening degree of the variable nozzle to the normal opening degree Ovnnml. These instructions are sent at the substantially-same time point (that is, the time point t1 in FIG. 6).

On the other hand, even when the absolute value of the difference between the valve-opening degree Oecv of the exhaust gas changeover valve 66 at the present moment and the target valve-opening degree Oecvtgt is larger than the threshold value Oecvth1, the same instructions are sent to the exhaust gas changeover valve actuator 66a and the variable nozzle mechanism 61c if the value of the response-time length determination flag XRTC is "0."

At the step 1025, the threshold value Oecvth1 is set at "a value where the amount of the energy of the exhaust gas entered into the high-pressure turbine 61b would not be controlled appropriately if the amount of change in the valve-opening degree of the exhaust gas changeover valve 66 is larger than the threshold value Oecvth1." For example, the threshold value Oecvth1 may be set so as to exceed the threshold value Oecvth1 in the case that the turbo mode of the engine 10 changes from the turbo mode 3 (the valve-opening degree of the exhaust gas changeover valve 66 is fully-open. See FIG. 4) to the turbo mode 1 (the valve-opening degree of the exhaust gas changeover valve 66 is fully-close).

Figure 11:
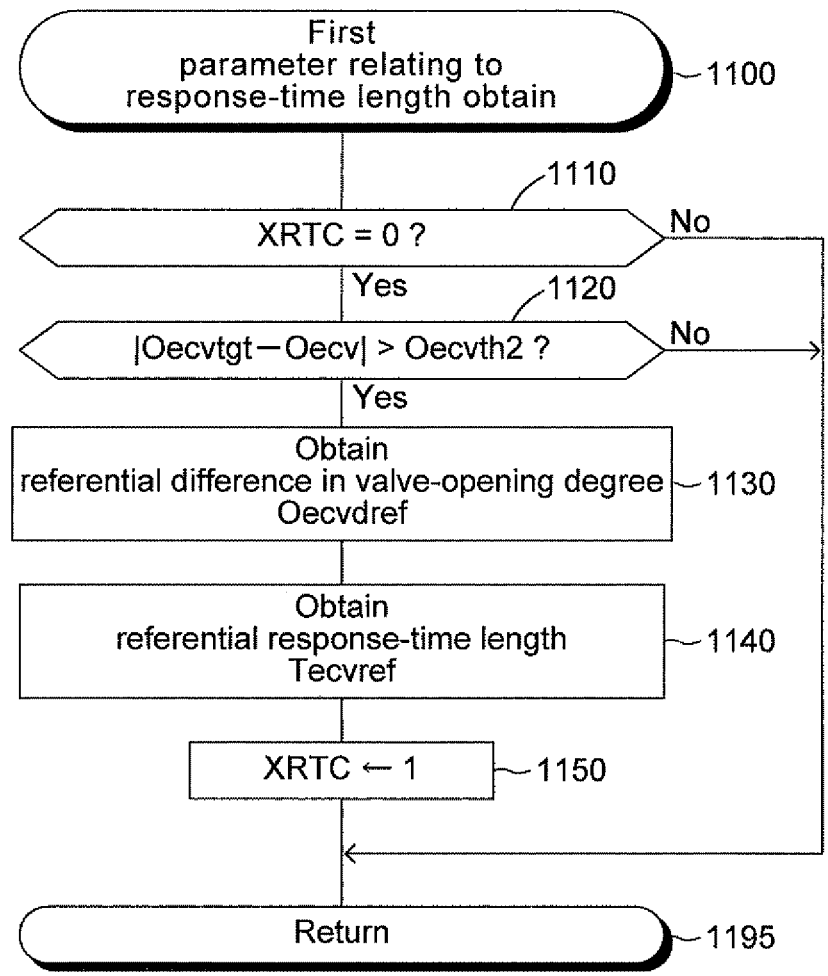
FIG. 11 is a flowchart illustrating a routine executed by a CPU of the control device according to the first embodiment of the present invention.

Next, the CPU 81 is configured to repeatedly execute the "first parameter relating to the response-time length obtain routine" illustrated by the flowchart in FIG. 11 every time the routine of FIG. 10 is executed. The CPU 81 obtains, as the parameter relating to the response-time length, "the referential difference Oecvdref in the valve-opening degree" and "the referential response-time length Tecvref."

Specifically, the CPU 81 starts the processing at the step 1100 of FIG. 11 at a predetermined timing after the processing in the step 1095 of FIG. 10 is executed, and then proceeds toward the step 1110. At the step 1110, the CPU 81 determines whether or not the value of the response-time length determination flag XRTC is "0." The value of the response-time length determination flag XRTC is "0" at the present moment in accordance with the precondition for default setting, then the CPU 81 makes the "Yes" determination at step 1110 and proceeds to step 1120.

At the step 1120, the CPU 81 determines whether or not the absolute value of the difference between the target valve-opening degree Oecvtgt of the exhaust gas changeover valve 66 and the valve-opening degree Oecv of the exhaust gas changeover valve 66 at the present moment is larger than a predetermined threshold value Oecvth2. The target valve-opening degree Oecvtgt and the valve-opening degree Oecv are the same as the target valve-opening degree Oecvtgt and the valve-opening degree Oecv employed in the step 1025 of FIG. 10.

At the step 1220, the threshold value Oecvth2 is set at "a value where an appropriate parameter relating to the response-time length would be obtained if the absolute value of the difference between the target valve-opening degree Oecvtgt and the valve-opening degree Oecv is larger than the threshold value Oecvth2."

When the "absolute value of the difference" at the present moment is equal to or smaller than the threshold value Oecvth2, the CPU 81 makes the "No" determination at step 1120 and proceeds to the step 1195 so as to end this routine once.

To the contrary, when the "absolute value of the difference" at the present moment is larger than the threshold value Oecvth2, the CPU 81 makes the "Yes" determination at step 1120 and proceeds to the step 1130. At the step 1130, the CPU 81 obtains the difference between the target valve-opening degree Oecvtgt and the valve-opening degree Oecv as the referential difference Oecvdref in the valve-opening degree (see FIG. 3).

Next, the CPU 81 proceeds to the step 1140. At the step 1140, the CPU 81 obtains, as the referential response-time length Tecvref, "the length of time from the time point at which the instruction is given to the exhaust gas changeover valve actuator 66a so as to match the valve-opening degree Oecv of the exhaust gas changeover valve 66 to the target valve-opening degree Oecvtgt to the time point at which the valve-opening degree Oecv of the exhaust gas changeover valve 66 matches to the target valve-opening degree Oecvtgt" (see FIG. 3).

Next, the CPU 81 proceeds to the step 1150. At the step 1150, the CPU 81 stores "1" as the value of the response-time length determination flag XRTC. After that, the CPU 81 proceeds to the step 1195 so as to end this routine once.

As described above, the CPU 81 obtains the referential difference Oecvdref in the valve-opening degree and the referential response-time length Tecvref as the parameter relating to the response-time length, when the parameter relating to the response-time length has not yet obtained (when the value of the response-time length determination flag XRTC is "0").

Next, when the CPU 81 starts the processing at the step 1000 of FIG. 10 at a predetermined timing "after" the parameter relating to the response-time length is obtained, the CPU 81 proceeds to the step 1025 through the step 1005 to the step 1020. The target valve-opening degree Oecvtgt of the exhaust gas changeover valve 66 and the normal opening degree Ovnnml of the variable nozzle are determined through these steps. Furthermore, the instruction is sent to the exhaust gas changeover valve actuator 66a so as to match the valve-opening degree of the exhaust gas changeover valve 66 to the target valve-opening degree Oecvtgt.

At the step 1025, if the absolute value of the difference at the present moment is larger than the threshold value Oecyth1, the CPU 81 makes the "Yes" determination at step 1025 and proceeds to the step 1035.

The value of the response-time length determination flag XRTC at the present moment is "1", then the CPU 81 makes the "Yes" determination at step 1035 and proceeds to step 1040. At the step 1040, the CPU 81 determines the opening degree Ovncom of the variable nozzle by applying the target valve-opening degree Oecvtgt, the valve-opening degree Oecv, the referential difference Oecvdref in the valve-opening degree and the referential response-time length Tecvref at the present moment to a table MapOvncom(Oecvtgt, Oecv, Oecvdref, Tecvref) for defining the compensation opening-degree of the variable nozzle. The table defines "the relationship among the target valve-opening degree Oecvtgt of the exhaust gas changeover valve 66, the valve-opening degree Oecv of the exhaust gas changeover valve 66 at the present moment, the referential difference Oecvdref in the valve-opening degree, the referential response-time length Tecvref, and the opening degree Ovncom of the variable nozzle for compensating the delay of response of the exhaust gas changeover valve 66" in advance. The opening degree Ovncom of the variable nozzle for compensating the delay of response of the exhaust gas changeover valve 66 is hereinafter referred to as "compensation opening degree Ovncom."

In the table MapOvncom (Oecvtgt, Oecv, Oecvdref, Tecvref), the opening degree Ovncom of the variable nozzle is determined to be an appropriate opening degree in view of the compensation of the delay of response of the exhaust gas changeover valve 66. In addition, the compensation opening degree Ovncom corresponds to the opening degree of the variable nozzle while the operation on which "the first device controls the opening degree Ovn of the variable nozzle in consideration of the response-time length of the exhaust gas changeover valve 66" is performed.

Next, the CPU 81 proceeds to the step 1045. At the step 1045, the CPU 81 determines the length of instruction time Tvninst by applying the target valve-opening degree Oecvtgt, the valve-opening degree Oecv, the referential difference Oecvdref in the valve-opening degree, and the referential response-time length Tecvref at the present moment to a table MapTvninst (Oecvtgt, Oecv, Oecvdref, Tecvref) for defining the length of instruction time to the variable nozzle. The table defines "the relationship among the target valve-opening degree Oecvtgt of the exhaust gas changeover valve 66, the valve-opening degree Oecv of the exhaust gas changeover valve 66 at the present moment, the referential difference Oecvdref in the valve-opening degree, the referential response-time length Tecvref, and the length of time Tvninst in which an instruction is given to the variable nozzle mechanism 61c so as to match the opening degree of the variable nozzle to the compensation opening degree Ovncom" in advance. The length of time Tvninst in which an instruction is given to the variable nozzle mechanism 61c so as to match the opening degree of the variable nozzle to the compensation opening degree Ovncom is hereinafter simply referred to as "length of instruction time Tvninst."

In the table MapTvninst(Oecvtgt, Oecv, Oecvdref, Tecvref), the length of instruction time Tvninst is determined to be an appropriate length in view of the compensation of the delay of response of the exhaust gas changeover valve 66.

Next, the CPU 81 proceeds to the step 1050. At the step 1050, the CPU 81 gives the instruction to the variable nozzle mechanism 61c so as to match the opening degree of the variable nozzle to the compensation opening degree Ovncom by the length of instruction time Tvninst. In addition, the time point at which the processing in the step 1050 is executed corresponds to "the time point t1" in FIG. 6.

Then, the CPU 81 proceeds to the step 1030 after the length of instruction time Tvninst elapsed. At the step 1030, the CPU 81 gives an instruction to the variable nozzle mechanism 61c so as to match the opening degree of the variable nozzle to the normal opening degree Ovnnml, which is determined in the step 1015. After that, the CPU 81 proceeds to the step 1095 so as to end this routine once.

As described above, when the absolute value of the difference between the valve-opening degree Oecv of the exhaust gas changeover valve 66 at the present moment and the target valve-opening degree Oecvtgt is larger than the threshold value Oecvth1, and, if the value of the response-time length determination flag XRTC is "1" (that is, the parameter relating to the response-time length has obtained), then the instruction is given to the exhaust gas changeover valve actuator 66a so as to match the valve-opening degree Oecv of the exhaust gas changeover valve 66 to the target valve-opening degree Oecvtgt, and the instruction is given to the variable nozzle mechanism 61c so as to match the opening degree of the variable nozzle to the compensation opening degree Ovncom by the length of instruction time Tvninst as well. These instructions are sent at the substantially-same time point (that is, the time point t1 in FIG. 6). In addition, the instruction is sent to the variable nozzle mechanism 61c so as to match the opening degree of the variable nozzle to the normal opening degree Ovnnml after the length of instruction time Tvninst elapsed.

<Function and Effect of Device>

When the amount of change in the valve-opening degree of the exhaust gas changeover valve 66 (|Oecvtgt−Oecv|) is larger than the predetermined threshold value Oecvth2, the first device obtains the amount of change in the valve-opening degree as "the referential difference Oecvdref in the valve-opening degree" and the required length of time to change the valve-opening degree of the exhaust gas changeover valve 66 by the above amount of change as "the referential response-time length Tecvref." The referential difference Oecvdref in the valve-opening degree and the referential response-time length are the parameters relating to the response-time length in the first device.

When the amount of change in the valve-opening degree of the exhaust gas changeover valve 66 is larger than the predetermined threshold value Oecvth1 "after" the parameters relating to the response-time length are obtained, the first device determines "the compensation opening degree Ovncom" and "the length of instruction time Tvninst" to control the opening degree of the variable nozzle based on the parameters relating to the response-time length (the referential difference in the valve-opening degree Oecvdref and the referential response-time length Tecvref).

The first device then gives the instruction to match the opening degree of the variable nozzle to the compensation opening degree Ovncom by the length of instruction time Tvninst in parallel with the change in the valve-opening degree of the exhaust gas changeover valve 66 (that is, from the substantially-same time point as the time point at which the valve-opening degree of the exhaust gas changeover valve 66 started to be changed).

The first device can thereby quickly match the energy of the exhaust gas entered into the high-pressure turbine 61b to the target value, as described above. Furthermore, the first device can decrease the length of the period in which the amount of the energy of the exhaust gas does not match the target value.

Second Embodiment

Next, a control device according to the second embodiment of the present invention (hereinafter referred to as "second device") is described below.

<Outline of Device>

The second device is applied to an internal combustion engine that has the similar configuration as the engine 10 that the first device is applied to (see FIG. 1. The internal combustion engine is hereinafter referred to as "engine 10" for convenience). Therefore, detailed description is omitted regarding the outline of the device to which the second device is applied.

<Outline of Operation of Device>

Outline of the operation of the second device applied to the engine 10 will be described below.

The second device obtains "the parameter relating to the response-time length" during actual operation of the engine 10. More specifically, it is presupposed that the operating condition of the engine 10 changes from first operating condition to second operating condition at a first time point when the engine 10 is driven under the first operating condition (wherein the valve-opening degree of the exhaust gas changeover valve 66 is a first valve-opening degree). Due to this change of the operating condition, "an instruction to change the valve-opening degree of the exhaust gas changeover valve 66 to a second valve-opening degree depending on the second operating condition" is given to the exhaust gas changeover valve actuator 66a. Then, the valve-opening degree of the exhaust gas changeover valve 66 matches to the second valve-opening degree at a second time point at which a predetermined length of time elapses from the time point at which the instruction is given to the exhaust gas changeover valve actuator 66a.

Figure 12:
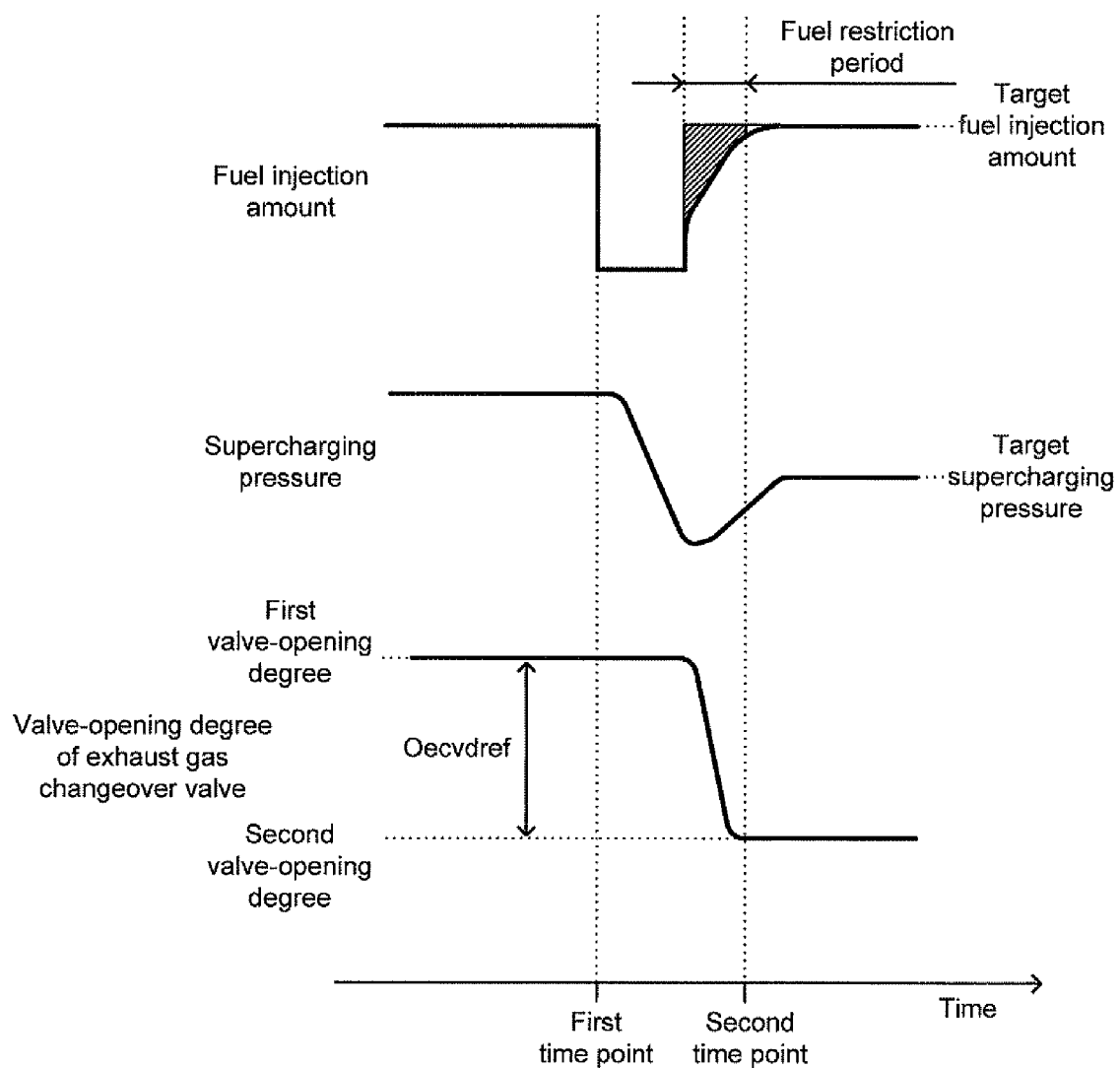
FIG. 12 is a diagram illustrating a relationship between a valve-opening degree of exhaust gas changeover valve 66, a supercharging pressure, a fuel injection amount, and time in the internal combustion engine of FIG. 1.

The second device obtains "the difference between the first valve-opening degree and the second valve-opening degree" as "the referential difference Oecvdref in the valve-opening degree" as illustrated in FIG. 12. The second device employs the referential difference Oecvdref in the valve-opening degree as one of the parameter relating to the response-time length.

Furthermore, there will be the period in which the pressure ratio HPxLP does not match to the target pressure ratio PRhplptgt in the period from the first time point to the second time point, as described above (see FIG. 5). The supercharging pressure Pim corresponds to a value obtained by multiplying an atmospheric pressure by the pressure ratio HPxLP, as described above. Therefore, it is thought that the supercharging pressure does not match the value determined based on the operating condition of the engine 10 (the target supercharging pressure) in the period at least from the first time point to the second time point, as illustrated in FIG. 12.

Additionally, in the case that it is configured to determine the upper amount of the fuel injection amount in connection with the supercharging pressure, the fuel injection amount may not match the value determined based on the operating condition of the engine 10 (the target fuel injection amount) during the period in which the supercharging pressure does not match the target supercharging pressure. For example, when it tries to increase the fuel injection amount to the target fuel injection amount at a predetermined time point between the first time point to the second time point, the fuel injection amount may not reach the target fuel injection amount since the supercharging pressure does not match the target supercharging pressure, as illustrated in FIG. 12. That is, there may be the case that the fuel injection amount is restricted (see "the fuel restriction period" in the figure). It is thought that the degree of the fuel restriction in the fuel restriction period relates to the response-time length of the exhaust gas changeover valve 66.

The second device therefore employs "the value obtained by accumulating the difference between the target fuel injection amount and the upper amount of the fuel injection amount over the fuel restriction period (which corresponds to the shaded area in the figure)" as "an accumulated fuel restriction amount Qlsum." The second device employs the accumulated fuel restriction amount Qlsum as one of the parameter relating to the response-time length.

Next, the second device control the opening degree of the variable nozzle based on the parameters relating to the response-time length (the referential difference Oecvdref in the valve-opening degree and the accumulated fuel restriction amount Qlsum) obtained as above. More specifically, "an instruction to change the valve-opening degree of the exhaust gas changeover valve 66 to a third valve-opening degree depending on third operating condition" is given to the exhaust gas changeover valve actuator 66a at a third time point at which the operating condition of the engine 10 changes to a third operating condition after the parameters relating to the response-time length are obtained. That is, an instruction to change the valve-opening degree of the exhaust gas changeover valve 66 by "a target difference in the valve-opening degree" is given to the exhaust gas changeover valve actuator 66a.

In this case, the second device determines a control rule of the opening-area based on the target difference in the valve-opening degree and the parameters relating to the response-time length. More specifically, the second device determines, as the control rule of the opening-area, "a target value of the opening degree of the variable nozzle (a compensation opening-degree of the variable nozzle)" and "a length of time in which an instruction to match the opening degree of the variable nozzle to the target value is given to the variable nozzle mechanism 61c (a length of instruction time of the variable nozzle)."

Then, the second device gives an instruction to the variable nozzle mechanism 61c so as to match the opening degree of the variable nozzle to "the compensation opening-degree of the variable nozzle" in a period from the third time to a time point at which "the length of instruction time of the variable nozzle" elapses. As described above, the second device controls the opening degree of the variable nozzle in parallel with the change of the valve-opening degree of the exhaust gas changeover valve 66. The above is the outline of operation of the second device.

<How to Determine Turbo Mode>

The second device determines the turbo mode as similar as the first device. Therefore, detailed description is omitted regarding how to determine turbo mode.

<How to Control the Opening Degree of the Variable Nozzle>

The second device controls the opening degree of the variable nozzle as similar as the first device. Therefore, detailed description is omitted regarding how to control the opening degree of the variable nozzle.

<Actual Operation>

Hereinafter, an actual operation of the second device will be described.

Figure 13:
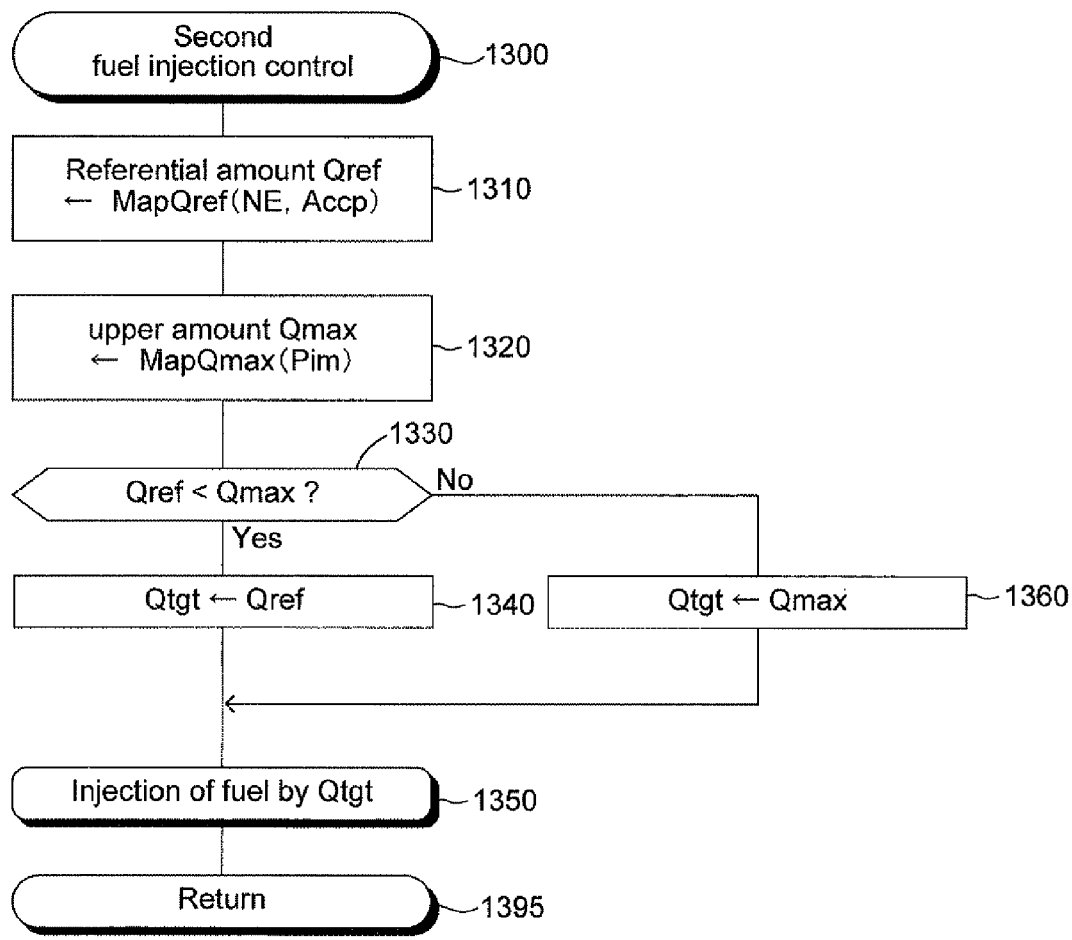
FIG. 13 is a flowchart illustrating a routine executed by a CPU of the control device according to the second embodiment of the present invention.
Figure 14:
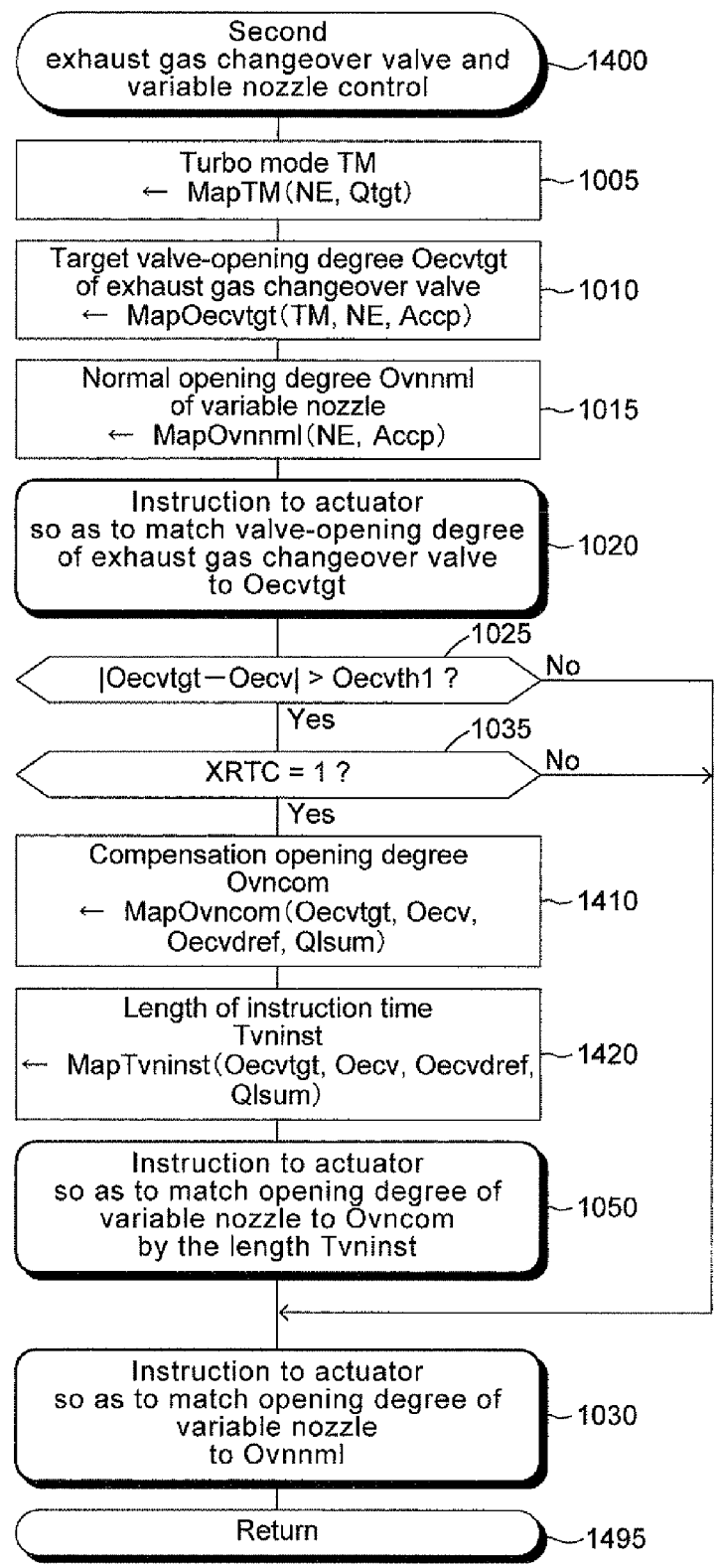
FIG. 14 is a flowchart illustrating a routine executed by a CPU of the control device according to the second embodiment of the present invention.
Figure 15:
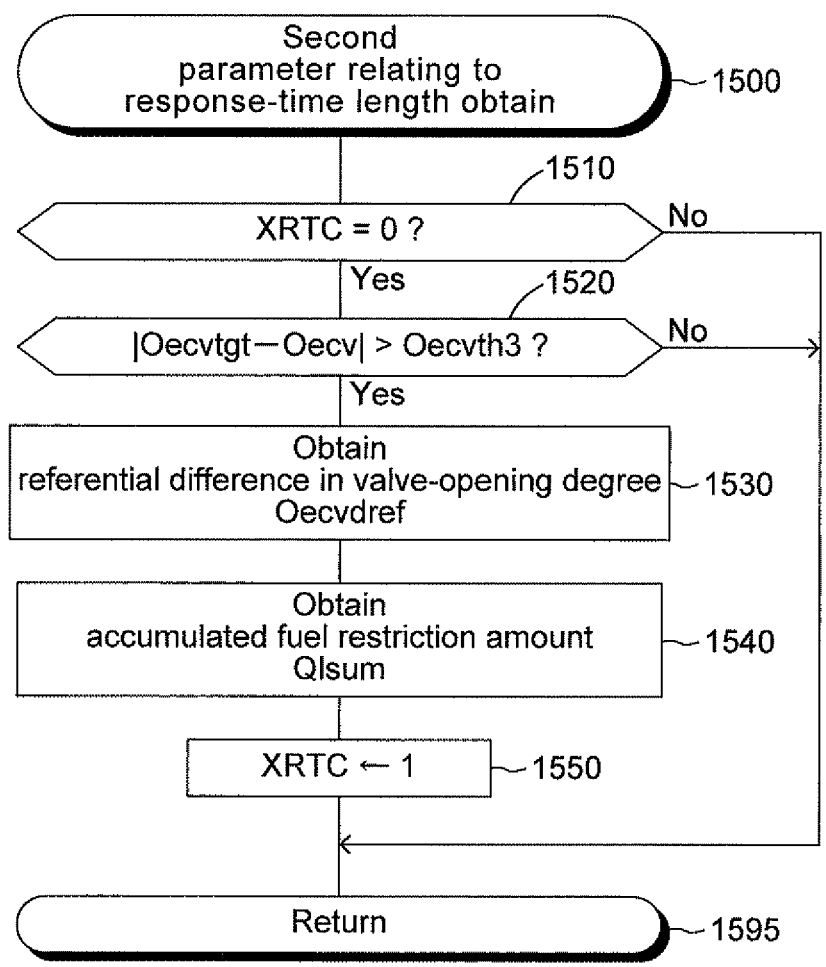
FIG. 15 is a flowchart illustrating a routine executed by a CPU of the control device according to the second embodiment of the present invention.

The CPU 81 in the second device is configured to execute the respective routines indicated by the flowcharts in FIG. 13 to FIG. 15 at every predetermined time. In these routines, the CPU 81 uses a response-time length determination flag XRTC, which is the same flag in the first device.

Hereinafter, the respective routines executed by the CPU 81 will be described in detail.

Firstly, it is presupposed that the value of the response-time length determination flag XRTC is set at "0" at the present moment. Hereinafter, this setting is referred to as "precondition for default setting", as same as the first device.

The CPU 81 is configured to repeatedly execute the "second fuel injection control routine" illustrated in the flowchart in FIG. 13 every time the crank angle of arbitrary cylinder becomes equal to a predetermined crank angle before the compression top dead center (for example, the crank angle of 90 degrees before the compression top dead center) θf. By this routine, the CPU 81 determines the target value Qtgt in the fuel injection amount and instructs the fuel injection device 22 to inject fuel by the target value Qtgt in the cylinder. The cylinder in which the crank angle is equal to the predetermined crank angle θf before the compression top dead center during the compression stroke is hereinafter referred to as "fuel injection cylinder", as same as the first device.

Specifically, the CPU 81 starts the processing at the step 1300 of FIG. 13 when the crank angle of arbitrary cylinder becomes to the crank angle θf, and then proceeds toward the step 1310. At the step 1310, the CPU 81 determines the referential amount Qref in the fuel injection amount by applying an engine rotation speed NE and an accelerator opening degree Accp at the present moment to a table MapQref(NE, Accp) for defining the referential amount of the fuel injection amount. The table defines "the relationship among the engine rotation speed NE, the accelerator opening degree Accp, and the referential amount Qref of the fuel injection amount" in advance.

In the step 1310, a value obtained by the crank position sensor 74 is employed as the engine rotation speed NE. Furthermore, a value obtained by the accelerator opening degree sensor 76 is employed as the accelerator opening degree Accp. Additionally, in the table MapQref (NE, Accp) for defining the referential amount of the fuel injection amount, the referential amount Qref of the fuel injection amount is determined to be an appropriate value that is set depending on an output torque, a fuel efficiency and an amount of emissions required for the engine 10.

Next, the CPU 81 proceeds to the step 1320. At the step 1320, the CPU 81 determines the upper amount Qmax of the fuel injection amount by applying a supercharging pressure Pim at the present moment to a table MapQmax(Pim) for defining the upper amount of the fuel injection amount. The table defines "the relationship between the supercharging pressure Pim, and the upper amount Qmax of the fuel injection amount" in advance.

In the step 1320, a value obtained by the supercharging pressure sensor 73 is employed as the supercharging pressure Pim. Furthermore, in the table MapQmax (Pim) for defining the upper amount of the fuel injection amount, the upper amount Qmax of the fuel injection amount is determined to be an appropriate value that is set depending on an output torque, strength of members constituting the engine 10, a fuel efficiency and an amount of emissions required for the engine 10.

Next, the CPU 81 proceeds to the step 1330. At the step 1330, the CPU 81 determines whether or not the referential amount Qref is larger than the upper amount Qmax.

When the referential amount Qref is smaller than the upper amount Qmax at the present moment, the CPU 81 makes the "Yes" determination at the step 1330 and proceeds to the step 1340. At the step 1340, The CPU 81 stores "the referential amount Qref" in the target amount Qtgt of the fuel injection amount.

The CPU 81 then proceeds to the step 1350. At the step 1350, the CPU 81 gives an instruction to the fuel injecting device 22 that is provided at the fuel injection cylinder so as to inject fuel by the target value Qtgt. That is, the fuel by the target value Qtgt is injected into the fuel injection cylinder. After that, the CPU 81 proceeds to the step 1195 so as to end this routine once.

On the other hand, when the referential amount Qref is equal to or larger than the upper amount Qmax at the present moment, the CPU makes the "No" determination at the step 1330 and proceeds to the step 1360. At the step 1360, the CPU 81 stores "the upper amount Qmax" in the target amount Qtgt of the fuel injection amount.

The CPU 81 then proceeds to the step 1350, gives an instruction to the fuel injecting device 22 so as to inject fuel by the target value Qtgt, and proceeds to the step 1395 so as to end this routine once.

As described above, the second device employs, as the target amount Qtgt of the fuel injection amount, the "smaller" one of "the referential amount Qref that is determined based on the operating condition of the engine 10" and "the upper amount Qmax that is determined based on the supercharging pressure Pim." The first device then instructs to inject fuel by the target amount Qtgt in the fuel injection cylinder.

Furthermore, the CPU 81 is configured to repeatedly execute the "second exhaust gas changeover valve and variable nozzle control routine" illustrated in FIG. 10 every predetermined time. The CPU 81 controls the valve-opening degree Oecv of the exhaust gas changeover valve 66 and the opening degree Ovn of the variable nozzle.

The routine illustrated in FIG. 14 is only different from the routine illustrated in FIG. 10 in that the step 1040 and the step 1045 are replaced with step 1410 and step 1420 respectively. Therefore, the other steps in FIG. 14 for executing the same processing as those steps in FIG. 10 are attached with the same step-numbers as those steps in FIG. 10. Detailed description is omitted regarding these steps.

More specifically about the routine of FIG. 14, the CPU 81 starts the processing at the step 1400 of FIG. 14 at a predetermined timing and then proceeds to the step 1025 through the step 1005 to the step 1020. The target valve-opening degree Oecvtgt of the exhaust gas changeover valve 66 and the normal opening degree Ovnnml of the variable nozzle are determined through these steps. Furthermore, the instruction is sent to the exhaust gas changeover valve actuator 66a so as to match the valve-opening degree of the exhaust gas changeover valve 66 to the target valve-opening degree Oecvtgt.

At the step 1025, if the absolute value of the difference between the valve-opening degree Oecv of the exhaust gas changeover valve 66 and the target valve-opening degree Oecvtgt at the present moment is smaller than the threshold value Oecvth1, the CPU 81 makes the "No determination at step 1025 and proceeds to the step 1030. The CPU 81 gives an instruction to the variable nozzle mechanism 61c so as to match the opening degree of the variable nozzle to the normal opening degree Ovnnml at the step 1030 and then proceeds to the step 1495 so as to end this routine once. In addition, the time point at which the processing of the step 1030 is executed coincides with the time point at which the processing of the step 1020 is executed (the time point t1 in FIG. 6) substantially.

To the contrary, if the absolute value of the difference between the valve-opening degree Oecv of the exhaust gas changeover valve 66 at the present moment and the target valve-opening degree Oecvtgt at the present moment is larger than the threshold value Oecvth1, the CPU 81 makes the "Yes" determination at step 1025 and proceeds to the step 1035. The value of the response-time length determination flag XRTC at the present moment is "0", in accordance with the precondition for default setting, then the CPU 81 makes the "No" determination at step 1035 and proceeds to step 1030.

The CPU 81 then sends the above instruction to the variable nozzle mechanism 61c at the step 1030 and proceeds to the step 1495 so as to end this routine once.

As described above, the instruction is sent to the exhaust gas changeover valve actuator 66a so as to match the valve-opening degree of the exhaust gas changeover valve 66 to the target valve-opening degree Oecvtgt, when the absolute value of the difference between the valve-opening degree Oecv of the exhaust gas changeover valve 66 at the present moment and the target valve-opening degree Oecvtgt is equal to or smaller than the threshold value Oecvth1, as same as the first device. Furthermore, the instruction is sent to the variable nozzle mechanism 61c so as to match the opening degree of the variable nozzle to the normal opening degree Ovnnml. These instructions are sent at the substantially-same time point (that is, the time point t1 in FIG. 6).

On the other hand, even when the absolute value of the difference between the valve-opening degree Oecv of the exhaust gas changeover valve 66 at the present moment and the target valve-opening degree Oecvtgt is larger than the threshold value Oecvth1, the same instructions are sent to the exhaust gas changeover valve actuator 66a and the variable nozzle mechanism 61*c* if the value of the response-time length determination flag XRTC is "0", as same as the first device.

Next, the CPU 81 is configured to repeatedly execute the "second parameter relating to the response-time length obtain routine" illustrated by the flowchart in FIG. 15 every time the routine of FIG. 14 is executed. The CPU 81 obtains, as the parameter relating to the response-time length, "the referential difference Oecvdref in the valve-opening degree" and "the accumulated fuel restriction amount Qlsum."

Specifically, the CPU 81 starts the processing at the step 1500 of FIG. 15 at a predetermined timing after the processing in the step 1495 of FIG. 14 is executed, and then proceeds toward the step 1510. At the step 1510, the CPU 81 determines whether or not the value of the response-time length determination flag XRTC is "0." The value of the response-time length determination flag XRTC is "0" at the present moment, in accordance with the precondition for default setting, then the CPU 81 makes the "Yes" determination at step 1510 and proceeds to step 1520.

At the step 1520, the CPU 81 determines whether or not the absolute value of the difference between the target valve-opening degree Oecvtgt of the exhaust gas changeover valve 66 and the valve-opening degree Oecv of the exhaust gas changeover valve 66 at the present moment is larger than a predetermined threshold value Oecvth3. The target valve-opening degree Oecvtgt and the valve-opening degree Oecv are the same as the target valve-opening degree Oecvtgt and the valve-opening degree Oecv employed in the step 1025 of FIG. 14.

At the step 1520, the threshold value Oecvth3 is set at "a value where an appropriate parameter relating to the response-time length would be obtained if the absolute value of the difference between the target valve-opening degree Oecvtgt and the valve-opening degree Oecv is larger than the threshold value Oecvth3."

When the "absolute value of the difference" at the present moment is equal to or smaller than the threshold value Oecvth3, the CPU 81 makes the "No" determination at step 1520 and proceeds to the step 1595 so as to end this routine once.

To the contrary, when the "absolute value of the difference" at the present moment is larger than the threshold value Oecvth3, the CPU 81 makes the "Yes" determination at step 1520 and proceeds to the step 1530. At the step 1530, the CPU 81 obtains the difference between the target valve-opening degree Oecvtgt and the valve-opening degree Oecv as the referential difference Oecvdref in the valve-opening degree (see FIG. 12).

Next, the CPU 81 proceeds to the step 1540. At the step 1540, the CPU 81 obtains, as the accumulated fuel restriction amount Qlsum, the value calculated by accumulating the difference between the referential amount Qref and the upper amount Qmax over the fuel restriction period, if there is a period (fuel restriction period) in which the upper amount Qmax is smaller than the referential amount Qref "between the time point at which the instruction is given to the exhaust gas changeover valve actuator 66*a* so as to match the valve-opening degree Oecv of the exhaust gas changeover valve 66 to the target valve-opening degree Oecvtgt to the time point at which the valve-opening degree Oecv of the exhaust gas changeover valve 66 matches to the target valve-opening degree Oecvtgt" (see FIG. 12).

Next, the CPU 81 proceeds to the step 1550. At the step 1550, the CPU 81 stores "1" as the value of the response-time length determination flag XRTC. After that, the CPU 81 proceeds to the step 1595 so as to end this routine once.

As described above, the CPU 81 obtains the referential difference Oecvdref in the valve-opening degree and the accumulated fuel restriction amount Qlsum as the parameter relating to the response-time length, when the parameter relating to the response-time length has not yet obtained (when the value of the response-time length determination flag XRTC is "0").

Next, when the CPU 81 starts the processing at the step 1400 of FIG. 14 at a predetermined timing "after" the parameters relating to the response-time length is obtained, the CPU 81 proceeds to the step 1025 through the step 1005 to the step 1020.

At the step 1025, if the absolute value of the difference between the valve-opening degree Oecv of the exhaust gas changeover valve 66 and the target valve-opening degree Oecvtgt at the present moment is larger than the threshold value Oecvth1, the CPU 81 makes the "Yes" determination at step 1025 and proceeds to the step 1035.

The value of the response-time length determination flag XRTC at the present moment is "1", then the CPU 81 makes the "Yes" determination at step 1035 and proceeds to step 1410. At the step 1410, the CPU 81 determines the opening degree Ovncom of the variable nozzle by applying the target valve-opening degree Oecvtgt, the valve-opening degree Oecv, the referential difference Oecvdref in the valve-opening degree and the accumulated fuel restriction amount Qlsum at the present moment to a table MapOvncom (Oecvtgt, Oecv, Oecvdref, Qlsum) for defining the compensation opening-degree of the variable nozzle. The table defines "the relationship among the target valve-opening degree Oecvtgt of the exhaust gas changeover valve 66, the valve-opening degree Oecv of the exhaust gas changeover valve 66 at the present moment, the referential difference Oecvdref in the valve-opening degree, the accumulated fuel restriction amount Qlsum, and the opening degree Ovncom of the variable nozzle for compensating the delay of response of the exhaust gas changeover valve 66" in advance. The opening degree Ovncom of the variable nozzle is hereinafter referred to as "compensation opening degree Ovncom" as same as the first device.

In the table MapOvncom(Oecvtgt, Oecv, Oecvdref, Qlsum), the opening degree Ovncom of the variable nozzle is determined to be an appropriate opening degree in view of the compensation of the delay of response of the exhaust gas changeover valve 66. In addition, the compensation opening degree Ovncom corresponds to the opening degree of the variable nozzle while the operation on which "the second device controls the opening degree Ovn of the variable nozzle in consideration of the response-time length of the exhaust gas changeover valve 66" is performed.

Next, the CPU 81 proceeds to the step 1420. At the step 1420, the CPU 81 determines the length of instruction time Tvninst by applying the target valve-opening degree Oecvtgt, the valve-opening degree Oecv, the referential difference Oecvdref in the valve-opening degree, and the accumulated fuel restriction amount Qlsum at the present moment to a table MapTvninst (Oecvtgt, Oecv, Oecvdref, Qlsum) for defining the length of instruction time to the variable nozzle. The table defines "the relationship among the target valve-opening degree Oecvtgt of the exhaust gas changeover valve 66, the valve-opening degree Oecv of the exhaust gas changeover valve 66 at the present moment, the referential difference Oecvdref in the valve-opening degree, the accumulated fuel restriction amount Qlsum, and the length of time Tvninst in which an instruction is given to the variable nozzle mechanism 61*c* so as to match the opening degree of the variable nozzle to the compensation opening degree Ovncom" in advance. The length of time Tvninst in which an instruction is given to the variable nozzle mechanism 61c so as to match the opening degree of the variable nozzle to the compensation opening degree Ovncom is hereinafter simply referred to as "length of instruction time Tvninst" as same as the first device.

In the table MapTvninst(Oecvtgt, Oecv, Oecvdref, Qlsum), the length of instruction time Tvninst is determined to be an appropriate length in view of the compensation of the delay of response of the exhaust gas changeover valve 66.

Next, the CPU 81 proceeds to the step 1050. At the step 1050, the CPU 81 gives the instruction to the variable nozzle mechanism 61c so as to match the opening degree of the variable nozzle to the compensation opening degree Ovncom by the length of instruction time Tvninst. In addition, the time point at which the processing in the step 1050 is executed corresponds to "the time point t1" in FIG. 6.

Then, the CPU 81 proceeds to the step 1030 after the length of instruction time Tvninst elapsed. At the step 1030, the CPU 81 gives an instruction to the variable nozzle mechanism 61c so as to match the opening degree of the variable nozzle to the normal opening degree Ovnnml, which is determined in the step 1015. After that, the CPU 81 proceeds to the step 1095 so as to end this routine once.

As described above, when the absolute value of the difference between the valve-opening degree Oecv of the exhaust gas changeover valve 66 at the present moment and the target valve-opening degree Oecvtgt is larger than the threshold value Oecvth1, and if the value of the response-time length determination flag XRTC is "1" (that is, the parameter relating to the response-time length has obtained), then the instruction is given to the exhaust gas changeover valve actuator 66a so as to match the valve-opening degree Oecv of the exhaust gas changeover valve 66 to the target valve-opening degree Oecvtgt, and the instruction is given to the variable nozzle mechanism 61c so as to match the opening degree of the variable nozzle to the compensation opening degree Ovncom by the length of instruction time Tvninst as well. These instructions are sent at the substantially-same time point (that is, the time point t1 in FIG. 6). In addition, the instruction is sent to the variable nozzle mechanism 61c so as to match the opening degree of the variable nozzle to the normal opening degree Ovnnml after the length of instruction time Tvninst elapsed.

<Function and Effect of Device>

When the amount of change in the valve-opening degree of the exhaust gas changeover valve 66 (|Oecvtgt−Oecv|) is larger than the predetermined threshold value Oecvth3, the second device obtains the amount of change in the valve-opening degree as "the referential difference Oecvdref in the valve-opening degree" and the value calculated by accumulating the fuel restriction amount (the difference between the referential amount Qref and the upper amount Qmax) occurred during the period in which the valve-opening degree of the exhaust gas changeover valve 66 changes as "the accumulated fuel restriction amount Qlsum." The referential difference Oecvdref in the valve-opening degree and the accumulated fuel restriction amount Qlsum are the parameters relating to the response-time length in the second device.

When the amount of change in the valve-opening degree of the exhaust gas changeover valve 66 is larger than the predetermined threshold value Oecvth1 "after" the parameters relating to the response-time length are obtained, the second device determines "the compensation opening degree Ovncom" and "the length of instruction time Tvninst" to control the opening degree of the variable nozzle based on the parameters relating to the response-time length (the referential difference in the valve-opening degree Oecvdref and the accumulated fuel restriction amount Qlsum).

The second device then gives the instruction to match the opening degree of the variable nozzle to the compensation opening degree Ovncom by the length of instruction time Tvninst in parallel with the change in the valve-opening degree of the exhaust gas changeover valve 66 (that is, from the substantially-same time point as the time point at which the valve-opening degree of the exhaust gas changeover valve 66 started to be changed).

The second device can thereby quickly match the energy of the exhaust gas entered into the high-pressure turbine 61b to the target value, as described above. Furthermore, the second device can decrease the length of the period in which the amount of the energy of the exhaust gas does not match the target value.

<General Overview of Embodiments>

Figure 2:
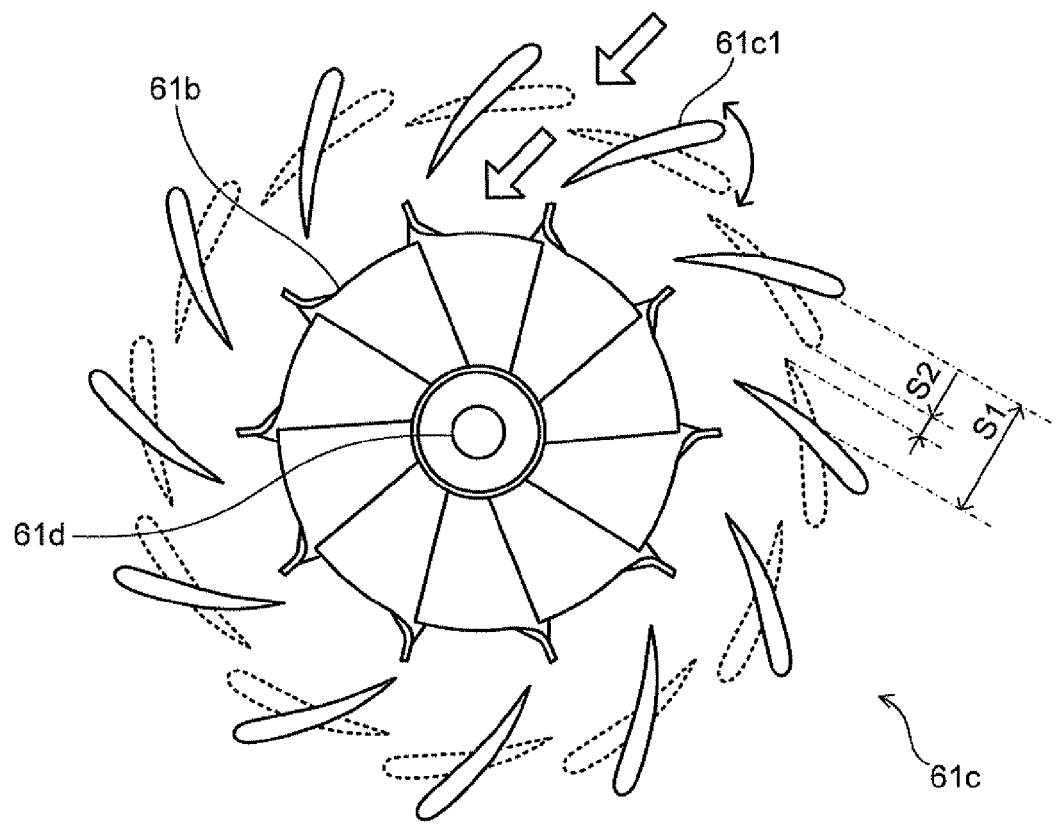
FIG. 2 is a schematic front view of a turbine and a variable nozzle mechanism of the internal combustion engine illustrated in FIG. 1.

As described above, the control devices according to the embodiments of the present invention is applied to an internal combustion engine having:

at least one supercharger 61 containing a turbine (the high-pressure turbine 61b), a compressor (the high-pressure compressor 61a), an opening-area control member (the variable nozzle mechanism 61c) changing an amount of energy of the exhaust gas entered into the turbine 61b by controlling an opening-area of the approach zone (see the areas S1 and S2 in FIG. 2. Hereinafter referred to as "S") depending on a first instruction; and at least one control valve (the exhaust gas changeover valve 66) changing an amount of energy of the exhaust gas entered into the turbine 61b by controlling a valve-opening degree Oecv of the control valve depending on a second instruction.

The first device and the second device comprises a control means for determining a control rule of the opening-area of the approach zone based on a target difference in the valve-opening degree (|Oecvtgt−Oecv|) and a parameter relating to a response-time length (the referential difference Oecvdref and the referential response-time length Tecvref in the first device, or the referential difference in the valve-opening degree Oecvdref and the accumulated fuel restriction amount Qlsum in the second device) upon the second instruction being given to the control valve 66 at an instruction time point (for example, the first time point t1 in FIG. 6) so as to change the valve-opening degree Oecv by the target difference (|Oecvtgt−Oecv|), and giving the first instruction to the opening-area control member 61c so as to start controlling the opening-area S of the approach zone in accordance with the control rule at the instruction time point t1 as starting time point (see the routines of FIG. 10 to FIG. 14). In these devices, the control rule of the opening-area is a relationship of the opening-area S of the approach zone with respect to time, and the response-time length is a required length of time between a time point where an instruction to control the valve-opening degree of the control valve is given to the control valve 66 and a time point where the valve-opening degree Oecv of the control valve matching to a degree corresponding to the instruction.

Furthermore, in regard to the first device and the second device, the opening-area control member 61c is a member where a speed of change in the opening-area S of the approach zone by the opening-area control member 61c due to the first instruction being faster than a speed of change in the valve-opening degree S of the control valve 66 by the control valve 66 due to the second instruction.

Furthermore, in regard to the first device and the second device, the control means (FIG. 10, FIG. 11, FIG. 13 and FIG. 14) determines a target opening-area of the approach zone (the compensation opening degree Ovncom) and a target instruction-time length (the length of instruction time Tvninst) as the control rule of the opening-area (see the routine in FIG. 11), wherein the target instruction-time length is a length of time where the instruction is given to the opening-area control member 61c so as to match the opening-area S of the approach zone to the target opening-area Ovncom, and the control means gives the instruction to the opening-area control member 61c so as to match the opening-area S of the approach zone to the target opening-area Ovncom as the first instruction during a period from the instruction time point t1 as starting time point to a time point where the target instruction-time length Tvninst elapses.

Furthermore, in regard to the first device and the second device, the opening-area control member 61c is a member where a required length of time from the instruction time point t1 to a time point where the opening-area S of the approach zone matches to the target opening-area Ovncom is shorter than a required length of time from the instruction time point t1 to a time point where the valve-opening degree of the control valve 66 is changed by the target difference in the valve-opening degree |Oecvtgt−Oecv| (for example, the time point t3 in FIG. 6).

Furthermore, in regard to the first device, the control means (FIG. 10 and FIG. 11) employs a referential response-time length Tecvref and a referential difference Oecvdref in the valve-opening degree as the parameter relating to the response-time length, wherein the referential response-time length Tecvref is a required length of time between a first time point t1 where an instruction is given to the control valve 66 so as to change the valve-opening degree from a first valve-opening degree Oecv to a second valve-opening degree Oecvtgt and a second time point (for example, the time point t3 in FIG. 6) where the valve-opening degree of the control valve 66 matches to the second valve-opening degree Oecvtgt, and the referential difference Oecvdref in the valve-opening degree is a difference between a magnitude of the first valve-opening degree and a magnitude of the second valve-opening degree (see FIG. 11).

Furthermore, in regard to the first device, the control means (FIG. 10 and FIG. 11) employing the referential response-time length Tecvref upon the referential difference Oecvdref in the valve-opening degree is larger than a predetermined threshold value Oecvth2 and the referential difference Oecvdref in the valve-opening degree as the parameter relating to the response-time length (when it makes the "Yes" determination at step 1120 in FIG. 11).

Furthermore, in regard to the second device, the internal combustion engine 10 has:

a means for obtaining supercharging pressure (the supercharging pressure sensor 73);

a means for determining fuel injection amount (see the routine in FIG. 13) so as to set the smaller one of a referential amount Qref of the fuel injection amount and an upper amount Qmax of the fuel injection amount; and a means for injecting fuel (the fuel injection device 22) in the combustion chamber by the target amount Qtgt.

The second device employs an accumulated amount Qlsum in the fuel restriction and a referential difference Oecvdref in the valve-opening degree as the parameter relating to the response-time length in the presence of a fuel restriction period where the upper amount Qmax is smaller than the referential amount Qref between a first time point t1 where an instruction is given to the control valve 66 so as to change the valve-opening degree from a first valve-opening degree Oecv to a second valve-opening degree Oecvtgt and a second time point t3 where the valve-opening degree of the control valve 66 matches to the second valve-opening degree Oecvtgt, wherein the accumulated amount Qlsum in the fuel restriction is an amount obtained by accumulating difference between the referential amount Qref and the upper amount Qmax over the fuel restriction period, and the referential difference Oecvdref in the valve-opening degree is a difference between a magnitude of the first valve-opening degree Oecv and a magnitude of the second valve-opening degree Oecvtgt (see the routine in FIG. 15).

In regard to the second device, the control means (FIG. 14 and FIG. 15) employs the accumulated amount Qlsum in the fuel restriction upon the referential difference Oecvdref in the valve-opening degree is larger than a predetermined threshold value Oecvth3 (when it makes the "Yes" determination at step 1520 in FIG. 15) and the referential difference Oecvdref in the valve-opening degree as the parameter relating to the response-time length.

In regard to the first device and the second device, the magnitude of the first valve-opening degree and the second valve-opening degree are not specifically limited. For example, the first device and the second device may be configured so that the first valve-opening degree Oecv is a valve-opening degree where the minimum amount of energy of the exhaust gas is entered into the turbine 61b (that is, fully open), and the second valve-opening degree Oecvtgt is a valve-opening degree where the maximum amount of energy of the exhaust gas is entered into the turbine 61b (that is, fully close).

Furthermore, the first device and the second device may be configured so that the first valve-opening degree Oecv is a valve-opening degree where the maximum amount of energy of the exhaust gas is entered into the turbine 61b (that is, fully close), and the second valve-opening degree Oecvtgt is a valve-opening degree where the minimum amount of energy of the exhaust gas being entered into the turbine 61b (that is, fully open).

In regard to the first device and the second device, the control means (FIG. 10, FIG. 11, FIG. 13 and FIG. 14) gives the first instruction to the opening-area control member 61c upon the target difference |Oecvtgt−Oecv| in the valve-opening degree is larger than a predetermined threshold value Oecvth1 (when it makes the "Yes" determination at step 1025 in FIG. 10, and when it makes the "Yes" determination at step 1025 in FIG. 14).

On the other hand, in regard to the first device and the second device, the opening degree of the variable nozzle when the opening degree is "controlled" in accordance with the present invention (that is, the compensation opening degree Ovncom) does not match the opening degree of the variable nozzle when the opening degree is "not controlled" (that is, the normal opening degree Ovnnml). In other words, the opening-area of the approach zone in accordance with the control rule of the opening-area is different from the opening-area of the approach zone not in accordance with the control rule of the opening-area.

While the invention has been described in detail by referring to the specific embodiments, it is apparent that various modifications or corrections may be made by the person skilled in the art without departing from the spirit and the scope of the invention.

For example, the first device and the second device obtain the parameter relating to the response-time length "only once" and control the opening degree of the variable nozzle based on the parameter relating to the response-time length. However, the control device of the present invention may be configured to obtain the parameter relating to the response-time length "more than once" and control the opening degree of the variable nozzle based on an average of those. Furthermore, the control device of the present invention may be configured to repeatedly obtain the parameter relating to the response-time length every predetermined time and "update" the parameter relating to the response-time length every time when the parameter is obtained.

Furthermore, "the threshold value Oecvth1 (the step 1025 in FIG. 10)," which is used to determine whether or not the opening degree of the variable nozzle should be restricted in accordance with the present invention, may be the same value as or a different value from "the threshold value Oecvth2 (the step 1120 in FIG. 11)" and "the threshold value Oecvth3 (the step 1520 in FIG. 15)," which are used to determine whether or not the parameter relating to the response-time length should be obtained.

Additionally, the internal combustion engine to which the first device and the second device are applied has two superchargers (the high-pressure supercharger 61 and the low-pressure supercharger 62). However, the control device of the present invention may be applied to an internal combustion engine that has one supercharger or an internal combustion engine that has three or more superchargers.

Furthermore, the first device and the second device obtain the valve-opening degree Oecv of the exhaust gas changeover valve 66 by the valve-opening degree sensor 75 for the exhaust gas changeover valve. However, the control device of the present invention does not necessarily require such means for obtaining the valve-opening degree Oecv of the exhaust gas changeover valve 66 (for example, the valve-opening degree sensor 75 in the first device and the second device).

More specifically, the control device of the present invention may be configured to employ, as "the valve-opening degree Oecv of the exhaust gas changeover valve 66 at the present moment," a value (valve-opening degree) that corresponds to an instruction signal for the exhaust gas changeover valve actuator 66a before the target valve-opening degree Oecvtgt is determined, when the control device determines "whether or not the control for matching the opening degree of the variable nozzle to the compensation opening degree Ovncom should be performed" (for example, see the step 1025 in FIG. 10 and FIG. 14). Furthermore, the control device of the present invention may be configured to employ the similar value when the control device determines "whether or not the parameter relating to the response-time length should be obtained" (for example, see the step 1120 in FIG. 11 and the step 1520 in FIG. 14). In the case that the control device of the present invention is configured as above, the valve-opening degree Oecv of the exhaust gas changeover valve 66 does not need to be obtained.

Furthermore, the control device of the present invention may be configured to "estimate" the valve-opening degree Oecv of the exhaust gas changeover valve 66 based on a table (map) in which a relationships between "a required length of time between a time point where an instruction is given to the exhaust gas changeover valve actuator 66a so as to change the valve-opening degree of the exhaust gas changeover valve 66 by a predetermined difference in the valve-opening degree and a time point where the valve-opening degree of the exhaust gas changeover valve 66 changes by the predetermined difference in the valve-opening degree (that is, the response-time length)" and "the predetermined difference in the valve-opening degree" is determined in advance by some experiments. Then, the control device of the present invention may be configured to obtain the referential response-time length Tecvref (for example, see the step 1140 in FIG. 11) and the accumulated fuel restriction amount Qlsum (for example, see the step 1540 in FIG. 15) based on the above estimated value of the valve-opening degree Oecv of the exhaust gas changeover valve 66. In the case that the control device of the present invention is configured as above, the valve-opening degree Oecv of the exhaust gas changeover valve 66 does not need to be obtained.

Furthermore, the control device of the present invention may be configured to perform a control in which the opening degree of the variable nozzle is matched to the compensation opening degree Ovncom except in the case that the amount of the target difference in the valve-opening degree |Oecvtgt−Oecv| is zero (that is, the control is unexceptionally performed when the valve-opening degree Oecv of the exhaust gas changeover valve 66 is changed). For example, the control device may be configured to set the threshold value Oecvth1 in the step 1025 of FIG. 10 at zero. In the case that the control device of the present invention is configured as above, the valve-opening degree Oecv of the exhaust gas changeover valve 66 does not need to be obtained or estimated since it can be determined "whether or not the control for matching the opening degree of the variable nozzle to the compensation opening degree Ovncom should be performed" based on the instruction given to the exhaust gas changeover valve actuator 66a.

To the contrary, the control device of the present invention may be configured to perform a control in which the opening degree of the variable nozzle is matched to the compensation opening degree Ovncom only in the case that the amount of the target difference in the valve-opening degree |Oecvtgt−Oecv| becomes the maximum value (that is, the control is performed only when the valve-opening degree Oecv of the exhaust gas changeover valve 66 is changed from the fully-open degree to the fully-close degree or from the fully-close degree to the fully-open degree). For example, the control device may be configured to determine "whether or not the value |Oecvtgt−Oecv| is the maximum value" in the step 1025 of FIG. 10. In the case that the control device of the present invention is configured as above, the valve-opening degree Oecv of the exhaust gas changeover valve 66 does not need to be obtained or estimated since it can be determined "whether or not the control for matching the opening degree of the variable nozzle to the compensation opening degree Ovncom should be performed" based on the instruction given to the exhaust gas changeover valve actuator 66a.

Furthermore, the control device of the present invention may be configured to employ, as the parameter relating to the response-time length, the referential difference Oecvdref in the valve-opening degree, the referential response-time length Tecvref, and the accumulated fuel restriction amount Qlsum when the amount of the target difference in the valve-opening degree |Ocvtgt−Oecv| becomes the maximum value (for example, see FIG. 11 and FIG. 15). In the case that the control device of the present invention is configured as above, the valve-opening degree Oecv of the exhaust gas changeover valve 66 does not need to be obtained or estimated if these parameters are obtained in advance by some experiments. Alternatively, these parameters may be calculated by using the estimated value of the valve-opening degree of the exhaust gas changeover valve 66 (for example, see FIG. 11 and FIG. 15).

Furthermore, the second device employs "the value Qlsum obtained by accumulating the difference between the target fuel injection amount and the upper amount during the fuel restriction period" (see the step 1540 in FIG. 12 and FIG. 15).

However, the control device of the present invention may be configured to employ "the difference between the target fuel injection amount and the upper amount itself" as one of the parameter relating to the response-time length.

The invention claimed is:

1. A control device for internal combustion engine, the control device being applied to an internal combustion engine having: at least one supercharger containing a turbine provided on an exhaust gas passage of the engine and driven by an exhaust gas being entered into the turbine through an approach zone, a compressor provided on an intake air passage of the engine and compressing air flowing through the intake air passage by being driven upon the turbine being driven, an opening-area control member changing an amount of energy of the exhaust gas entered into the turbine by controlling an opening-area of the approach zone depending on a first instruction; and at least one control valve changing an amount of energy of the exhaust gas entered into the turbine by controlling a valve-opening degree of the control valve depending on a second instruction, the control device comprising a control unit having control logic configured to cause the control unit to determine a control rule of the opening-area of the approach zone based on a target difference in the valve-opening degree and a parameter relating to a response-time length upon the second instruction being given to the control valve at an instruction time point so as to change the valve-opening degree by the target difference, and giving the first instruction to the opening-area control member so as to start controlling the opening-area of the approach zone in accordance with the control rule at the instruction time point as starting time point, the control rule of the opening-area being a relationship of the opening-area of the approach zone with respect to time, the response-time length being a required length of time between a time point where an instruction to control the valve-opening degree of the control valve being given to the control valve and a time point where the valve-opening degree of the control valve matching to a degree corresponding to the instruction.

2. The control device according to claim 1, wherein the opening-area control member being a member where a speed of change in the opening-area of the approach zone by the opening-area control member due to the first instruction being faster than a speed of change in the valve-opening degree of the control valve by the control valve due to the second instruction.

3. The control device according to claim 1, wherein the control unit determining a target opening-area of the approach zone and a target instruction-time length as the control rule of the opening-area, the target instruction-time length being a length of time where the instruction being given to the opening-area control member so as to match the opening-area of the approach zone to the target opening-area, and the control unit giving the instruction to the opening-area control member so as to match the opening-area of the approach zone to the target opening-area as the first instruction during a period from the instruction time point as starting time point to a time point where the target instruction-time length elapses.

4. The control device according to claim 3, wherein the opening-area control member being a member where a required length of time from the instruction time point to a time point where the opening-area of the approach zone matching to the target opening-area being shorter than a required length of time from the instruction time point to a time point where the valve-opening degree of the control valve being changed by the target difference in the valve-opening degree.

5. The control device according to claim 1, wherein the control unit employing a referential response-time length and a referential difference in the valve-opening degree as the parameter relating to the response-time length, the referential response-time length being a required length of time between a first time point where an instruction being given to the control valve so as to change the valve-opening degree from a first valve-opening degree to a second valve-opening degree and a second time point where the valve-opening degree of the control valve matching to the second valve-opening degree, the referential difference in the valve-opening degree being a difference between a magnitude of the first valve-opening degree and a magnitude of the second valve-opening degree.

6. The control device according to claim 5, wherein the control unit employing the referential response-time length upon the referential difference in the valve-opening degree being larger than a predetermined threshold value and the referential difference in the valve-opening degree as the parameter relating to the response-time length.

7. The control device according to claim 5, wherein the first valve-opening degree being a valve-opening degree where the minimum amount of energy of the exhaust gas being entered into the turbine, and the second valve-opening degree being a valve-opening degree where the maximum amount of energy of the exhaust gas being entered into the turbine.

8. The control device according to claim 5, wherein the first valve-opening degree being a valve-opening degree where the maximum amount of energy of the exhaust gas being entered into the turbine, and the second valve-opening degree being a valve-opening degree where the minimum amount of energy of the exhaust gas being entered into the turbine.

9. The control device according to claim 1, wherein the internal combustion engine having:

a sensor obtaining supercharging pressure, the supercharging pressure being a pressure of air entered into a combustion chamber of the engine after being compressed by the compressor;

an electric control device determining fuel injection amount so as to set the smaller one of a referential amount of the fuel injection amount determined based on operating condition of the engine and an upper amount of the fuel injection amount determined based on a predetermined operation parameter including the supercharging pressure as a target amount of the fuel injection amount; and a fuel injector injecting fuel in the combustion chamber by the target amount, the control unit employing an accumulated amount in the fuel restriction and a referential difference in the valve-opening degree as the parameter relating to the response-time length in the presence of a fuel restriction period where the upper amount being smaller than the referential amount between a first time point where an instruction being given to the control valve so as to change the valve-opening degree from a first valve-opening degree to a second valve-opening degree and a second time point where the valve-opening degree of the control valve matching to the second valve-opening degree, the accumulated amount in the fuel restriction being an amount obtained by accumulating difference between the referential amount and the upper amount over the fuel restriction period, the referential difference in the valve-opening degree being a difference between a magnitude of the first valve-opening degree and a magnitude of the second valve-opening degree.

10. The control device according to claim 9,
wherein the control unit employing the accumulated amount in the fuel restriction upon the referential difference in the valve-opening degree being larger than a predetermined threshold value and the referential difference in the valve-opening degree as the parameter relating to the response-time length.

11. The control device according to claim 1,
wherein the control unit giving the first instruction to the opening-area control member upon the target difference in the valve-opening degree being larger than a predetermined threshold value.

* * * * *